(12) United States Patent
Beck et al.

(10) Patent No.: US 11,635,131 B2
(45) Date of Patent: Apr. 25, 2023

(54) TRANSMISSION HAVING A TORQUE VECTORING SUPERPOSITION UNIT

(71) Applicant: ZF FRIEDRICHSHAFEN AG, Friedrichshafen (DE)

(72) Inventors: Stefan Beck, Eriskirch (DE); Matthias Reisch, Ravensburg (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 17/621,412

(22) PCT Filed: Mar. 5, 2020

(86) PCT No.: PCT/EP2020/055786
§ 371 (c)(1),
(2) Date: Dec. 21, 2021

(87) PCT Pub. No.: WO2020/259875
PCT Pub. Date: Dec. 30, 2020

(65) Prior Publication Data
US 2022/0356936 A1 Nov. 10, 2022

(30) Foreign Application Priority Data
Jun. 28, 2019 (DE) .................... 10 2019 209 460.0

(51) Int. Cl.
*F16H 48/36* (2012.01)
*B60K 17/16* (2006.01)
(Continued)

(52) U.S. Cl.
CPC .......... *F16H 48/36* (2013.01); *B60K 17/165* (2013.01); *F16H 37/0813* (2013.01);
(Continued)

(58) Field of Classification Search
CPC ...... F16H 48/36; F16H 37/0813; F16H 48/10; F16H 2048/368; F16H 2048/106;
(Continued)

(56) References Cited

U.S. PATENT DOCUMENTS 7,393,296 B2 * 7/2008 Kano ...................... F16H 3/728
475/5
8,012,057 B2 * 9/2011 Meixner ................ B60K 17/16
475/221

FOREIGN PATENT DOCUMENTS

DE 19524547 1/1996
DE 102008029282 12/2009
(Continued)

OTHER PUBLICATIONS

Office Action of the corresponding German Patent Application No. 10 2019 209 460.0.

*Primary Examiner* — Justin Holmes
(74) *Attorney, Agent, or Firm* — Cozen O'Connor

(57) ABSTRACT

A transmission having input and output shafts and planetary gear sets. Each planetary gear set has multiple elements. The input and output shafts and planetary gear sets are designed so torque introduced via the input shaft is distributed to the output shafts in a defined ratio and a sum torque is prevented. An element of a first planetary gear set is rotationally fixed to another element of a second planetary gear set and another element of the second planetary gear set is secured to a rotationally fixed component. A torque vectoring superposition unit has an epicyclic gearing and two switching elements. The epicyclic gearing has four connection shafts. A first connection shaft is rotationally fixed to the linking shaft. A second connection shaft is rotationally fixed to an output shaft of the first planetary gear set. The switching elements secure a third and fourth connection shaft to a fixed component.

17 Claims, 30 Drawing Sheets

(51) Int. Cl.
  *F16H 37/08* (2006.01)
  *F16H 48/10* (2012.01)
  *B60K 1/00* (2006.01)

(52) U.S. Cl.
  CPC ........ *F16H 48/10* (2013.01); *B60K 2001/001* (2013.01); *F16H 2048/368* (2013.01)

(58) Field of Classification Search
  CPC ......... F16H 2048/364; F16H 2048/104; B60K 17/165; B60K 2001/001; B60K 23/04; B60K 5/02; B60K 2023/043; B60K 1/00; B60K 17/356; B60Y 2400/73
  See application file for complete search history.

(56) References Cited

FOREIGN PATENT DOCUMENTS

| | | | | |
|---|---|---|---|---|
| DE | 102008056622 | 5/2010 | | |
| DE | 102013214095 | 1/2015 | | |
| DE | 102018112880 | 12/2018 | | |
| DE | 102017220170 B3 * | 3/2019 | ............... | B60K 1/00 |
| WO | WO 0209966 | 2/2002 | | |
| WO | WO 2006089334 | 8/2006 | | |
| WO | WO 2007035977 | 4/2007 | | |
| WO | WO-2014191091 A1 * | 12/2014 | ........... | B60K 17/165 |
| WO | WO-2019091750 A1 * | 5/2019 | ............... | B60K 1/00 |

* cited by examiner

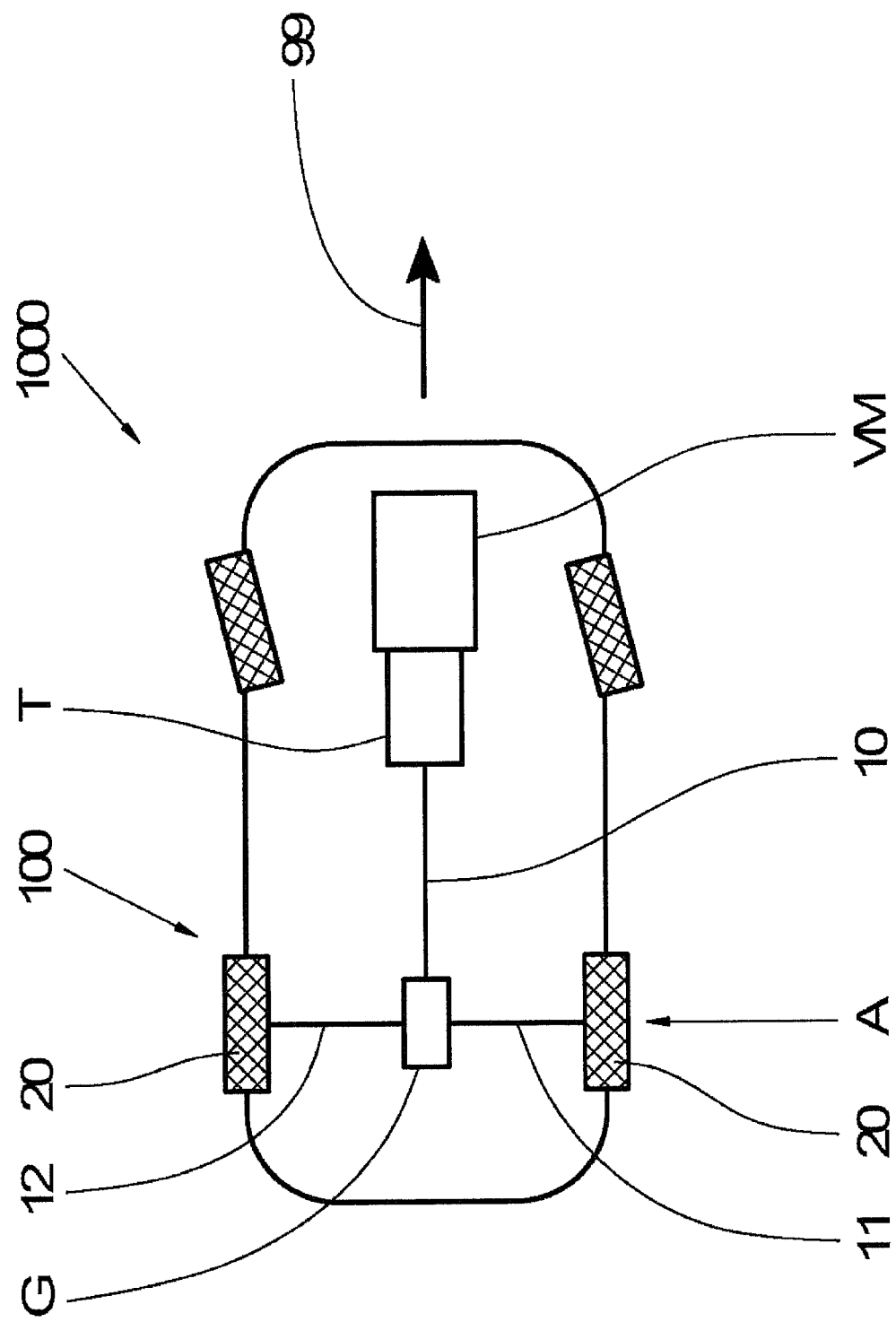

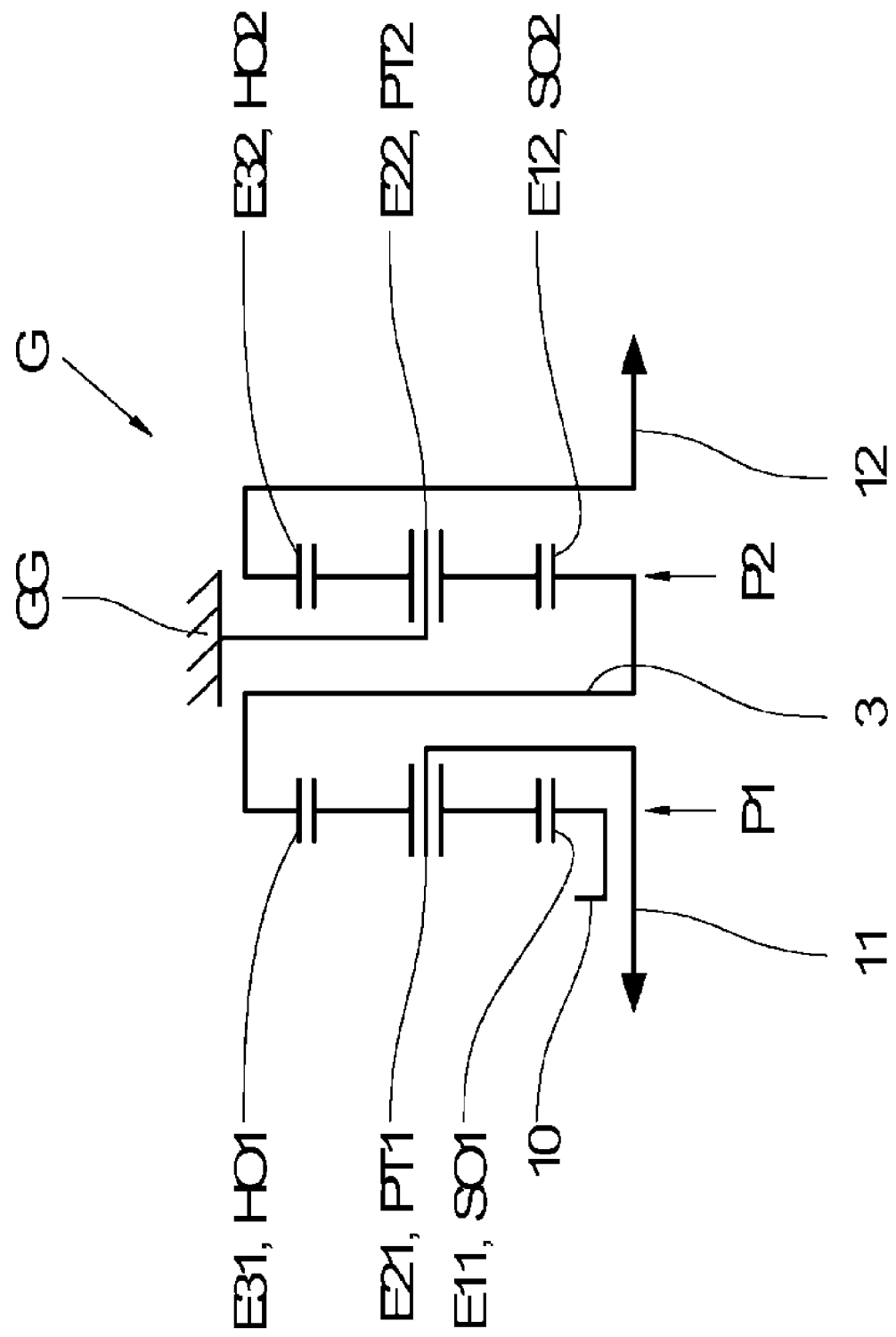

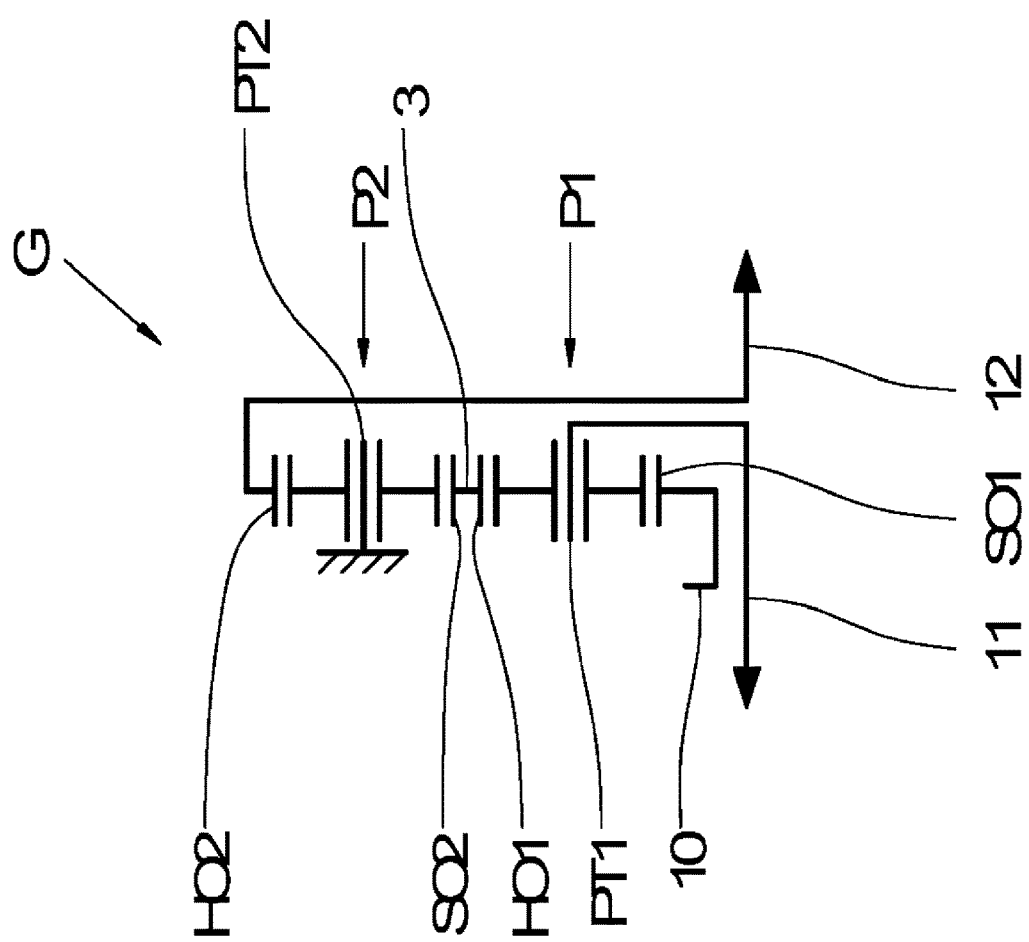

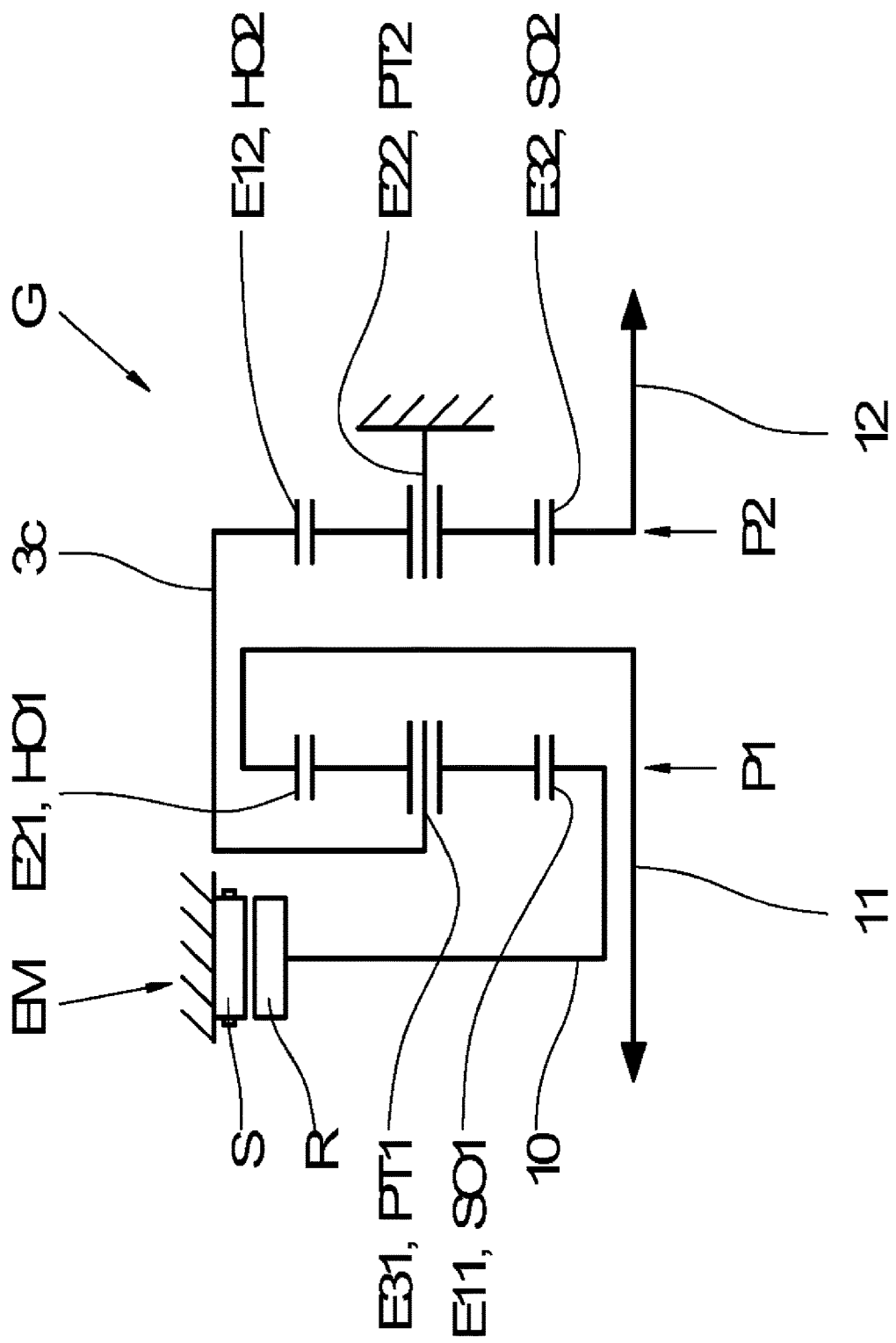

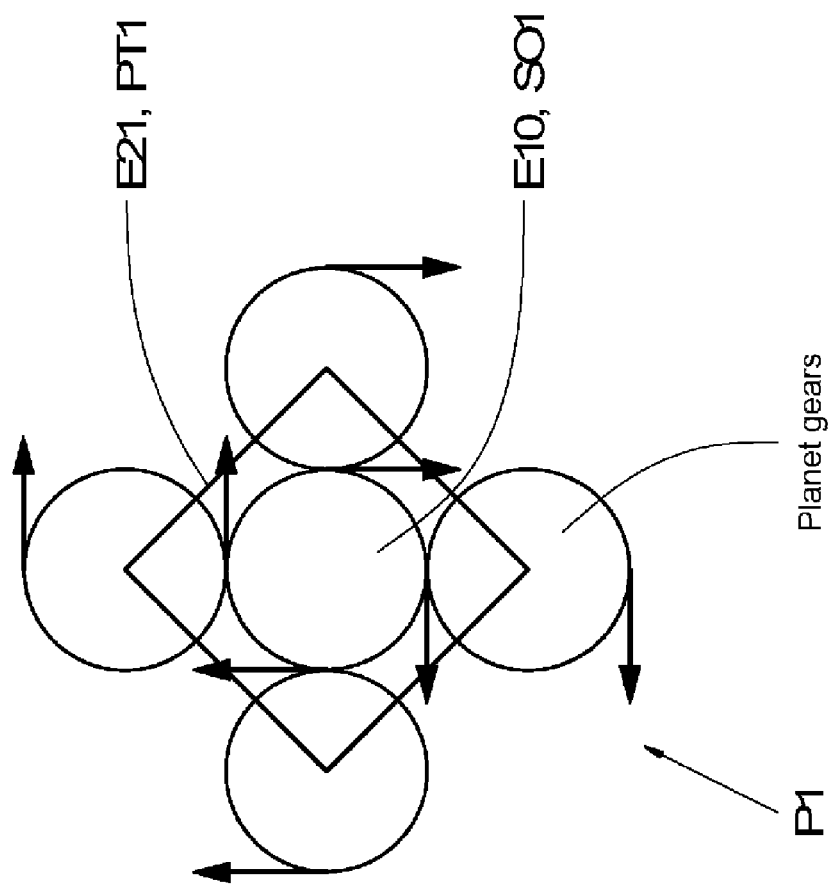
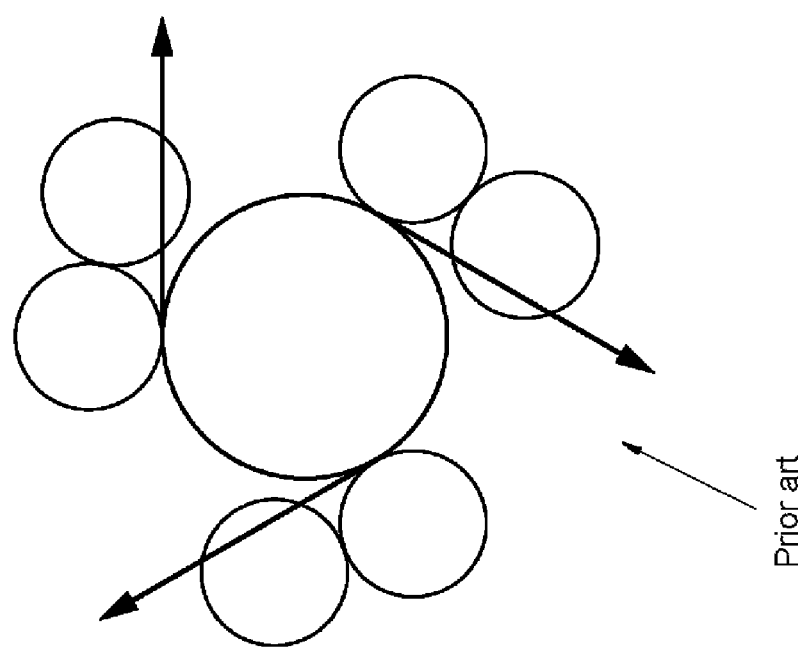
Fig. 15

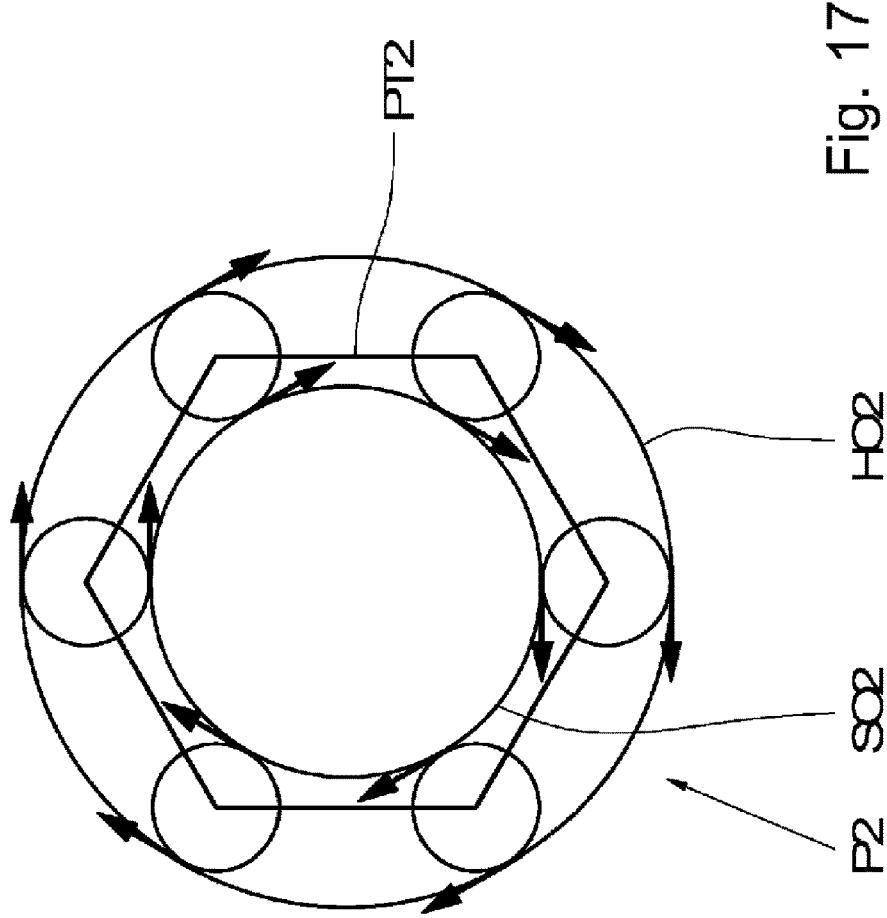
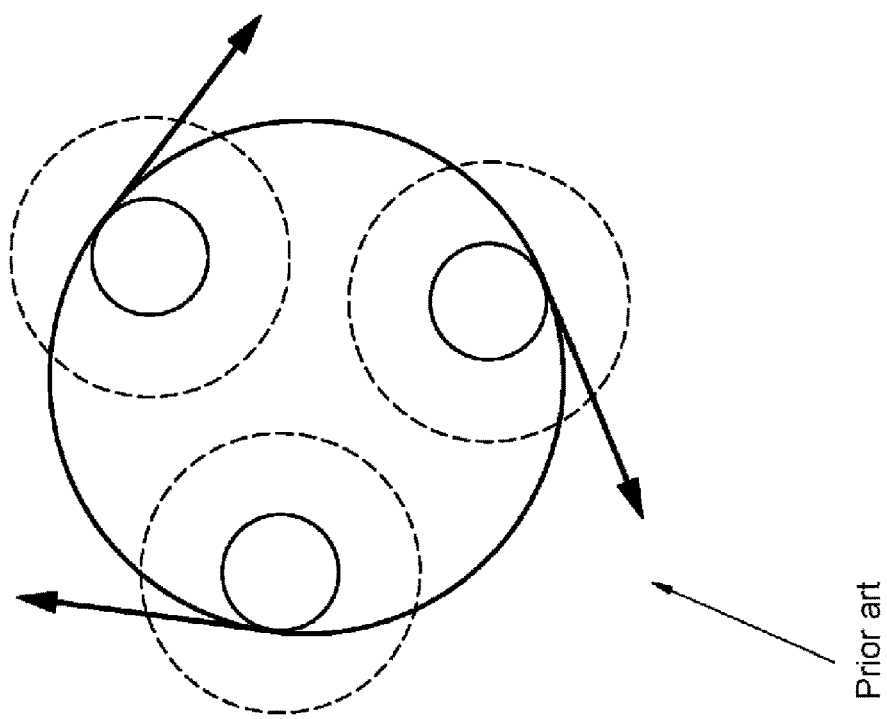
Fig. 17

| Figure | P1 | P2 | Calculation rule |
|---|---|---|---|
| 2, 3 | minus | minus | $i_{o2} = \dfrac{1}{i_{o1}} - 1$ |
| 8 | minus | minus | $i_{o2} = \dfrac{1}{i_{o1}} - 1$ |
| 9 | minus | minus | $i_{o2} = i_{o1} - 1$ |
| 4 | plus | minus | $i_{o2} = \dfrac{1}{1 - i_{o1}} - 1$ |
| 6 | minus | plus | $i_{o2} = 2 - \dfrac{1}{i_{o1}}$ |
| 5 | plus | plus | $i_{o2} = 2 + \dfrac{1}{i_{o1}} - 1$ |

Fig. 19

TRANSMISSION HAVING A TORQUE VECTORING SUPERPOSITION UNIT

CROSS REFERENCE TO RELATED APPLICATIONS

This is a U.S. national stage of Application No. PCT/EP2020/055786 filed Mar. 5, 2020. Priority is claimed on German Application No. DE 10 2019 209 460.0 filed Jun. 28, 2019 the content of which is incorporated herein by reference.

BACKGROUND OF THE INVENTION

1. Field of the Invention

The disclosure relates to a transmission having a torque vectoring superposition unit. The invention also relates to a drivetrain and a vehicle.

2. Description of Related Art

A conventional differential transmission makes cornering possible by allowing different rotational speeds of the two drive wheels. The conventional transmission transmits the drive torque equally to both wheels (open differential). It is disadvantageous that that wheel that has the better grip only has as much traction as that which is situated on slippery ground or which is lightly loaded during cornering. A differential lock can be used to increase traction and improve driving dynamics, which differential lock partially connects the two drive wheels to one another by way of friction. With adjustable differential locks, the cornering ability of an open differential can be combined with the improved traction of a locking differential. The differential transmission is also known as a differential or differential compensating transmission.

An integrated differential is known from DE 10 2018 112 880 A1.

It is also known from the prior art for differential transmissions that have a torque superposition function, so-called torque vectoring transmissions (TV transmissions), to be provided for sports passenger motor vehicles. Such a TV transmission allows wheel-specific distribution of torque between the two wheel-side output shafts of the differential transmission. Such a system can generate the desired torque in every driving situation, even when the clutch is depressed, because it transmits the braking torque on one side as drive torque to the other side.

The effect is based on a controlled redistribution of the drive torques and is also referred to as "Active Yaw Control (AYC)".

In known embodiments, a classic differential compensating transmission, for example a bevel-gear differential or planetary differential, is supplemented by two individual or combined superposition units.

A superposition unit is composed of a speed ratio stage, for example a planetary transmission, and an actuatable friction-type shift element.

The speed ratio stage connects one of the output shafts either to the drive element, as known for example from WO 2007/035977 A2 and WO 2006/089334 A1, or to the opposite output shaft.

The support of the speed ratio stage is connected to a friction-type shift element. The friction-type shift element can be supported, as a brake, with respect to the housing, or as a clutch, with respect to an internal component. The targeted redistribution of the drive torques between the two output shafts is implemented through controlled actuation of the friction-type shift elements. It is disadvantageous that the actuation of the friction-type shift elements in TV transmissions generates losses that have a negative impact both on the heat balance of the transmission and on the efficiency of the vehicle.

Furthermore, in known TV transmissions, the superposition unit is implemented twofold. This is because the directional torque of a multiplate clutch or multiplate brake necessitates a double implementation of the superposition units in order to ensure a symmetrical TV function, such as the torque distribution in both directions.

SUMMARY OF THE INVENTION

One aspect of the present invention is a transmission, in particular an integrated differential with a torque vectoring superposition unit. It is a further aspect of the invention to provide a drivetrain. A further object is to provide a vehicle.

The transmission comprises an input shaft, a first output shaft, a second output shaft, a first planetary gear set and a second planetary gear set connected to the first planetary gear set. The planetary gear sets each comprise multiple elements. The input shaft, the two output shafts, the planetary gear sets and elements thereof are arranged and configured such that a torque introduced via the input shaft is converted and divided between the two output shafts in a defined ratio, and the generation of a sum torque is prevented. Here, at least one element of the first planetary gear set is connected rotationally conjointly to another element of the second planetary gear set, and a further element of the second planetary gear set is fixed to a non-rotatable structural element.

The elements of the planetary gear sets are in particular in the form of sun gear, planet carrier and ring gear. If an element is fixed, it is prevented from rotating. The non-rotatable structural element of the transmission may preferably be a permanently static component, preferably a housing of the transmission, a part of such a housing or a structural element connected to said housing in a non-rotatable manner.

In the context of the invention, a "shaft" is to be understood to mean a rotatable structural part of the transmission, via which respectively associated components of the transmission are connected rotationally conjointly to one another or via which such a connection is established when a corresponding shift element is actuated. The respective shaft may in this case connect the components to one another axially or radially or both axially and radially. The respective shaft may thus also be present as an intermediate piece, via which a respective component is connected radially, for example. The term "shaft" does not preclude that the components to be connected may be formed in one piece.

In the context of the invention, "axial" means an orientation in the direction of a longitudinal central axis along which the planetary gear sets are arranged so as to lie coaxially with respect to one another. "Radial" is then to be understood to mean an orientation in the diameter direction of a shaft which lies on said longitudinal central axis.

A torque can be introduced into the transmission via the input shaft. The drive by which a torque can be introduced into the transmission may be realized by any drive source, for example by a drive machine in the form of an internal combustion engine or in the form of an electric machine.

The specification of the torque conversion is to be understood as follows:

The transmission has two output shafts, the torque sum of which, in relation to the input torque, describes the conversion of the transmission. The transmission has two output shafts, the respective speed ratio of which is initially not defined. It is the coupling of the two output shafts, for example via wheels of the vehicle on a roadway, that first generates defined rotational speeds. If both output shafts rotate at the same rotational speed, for example during straight-ahead travel, then, as in the prior art, the speed ratio can be formed as a rotational speed ratio between the input rotational speed and one of the two identical output rotational speeds. In all other cases, it is not possible to use the common definition of speed ratio to specify a speed ratio of the transmission.

The first and second planetary gear set of the transmission may be designed as either a minus or a plus planetary gear set. A combination of minus and plus planetary gear sets is also possible.

A minus planetary set is, in a manner known in principle to a person skilled in the art, made up of the elements sun gear, planet carrier and ring gear, wherein the planet carrier guides at least one but preferably multiple planet gears in rotatably mounted fashion, which planet gears specifically mesh in each case with both the sun gear and the surrounding ring gear.

In the case of a plus planetary set, it is likewise the case that the elements sun gear, ring gear and planet carrier are present, wherein the latter guides at least one planet gear pair, in the case of which one planet gear is in tooth meshing engagement with the inner sun gear and the other planet gear is in tooth meshing engagement with the surrounding ring gear, and the planet gears mesh with one another.

Where a connection of the individual elements is possible, a minus planetary set can be converted into a plus planetary set, wherein, then, in relation to the embodiment of a minus planetary set, the ring gear and the planet carrier connections must be interchanged with one another and the magnitude of the static transmission ratio must be increased by one. Conversely, it would also be possible for a plus planetary set to be replaced by a minus planetary set, if the connection of the elements of the transmission allows this. In this case, in relation to the plus planetary set, the ring gear and the planet carrier connection would then likewise have to be interchanged with one another, and a static transmission ratio would have to be reduced by one, and the sign would have to be changed. In the context of the invention, the two planetary gear sets of the transmission are preferably each designed as a minus planetary gear set. These have good efficiency and can be arranged axially adjacent to one another and nested radially.

The first two planetary gear sets may be arranged axially adjacent to one another. The first planetary gear set may however also be arranged radially within the second planetary gear set. The latter embodiment is also referred to as a nested arrangement of the planetary gear sets.

The toothings of the two interconnected elements of the first and second planetary gear sets, that is to say of the third element of the first planetary gear set and of the first element of the second planetary gear set, may be formed on the same structural part. Furthermore, a pitch of the toothing on the third element of the first planetary gear set and on the first element of the second planetary gear set may be identical. The identical pitch allows the connecting structural part or the coupling shaft to be free from axial forces, such that an expensive axial bearing can be omitted.

The input shaft of the transmission may be connected to a drive machine, in particular an electric machine or an internal combustion engine, for the introduction of a torque into the transmission. According to one aspect of the invention, the rotor of the electric machine is connected rotationally conjointly to the input shaft. As an alternative to this, in one possible embodiment of the transmission, the rotor is connected to the input shaft via at least one speed ratio stage. The electric machine may be arranged so as to lie either coaxially with respect to the planetary gear sets or axially parallel with respect thereto. In the first-mentioned case, the rotor of the electric machine may in this case either be directly connected rotationally conjointly to the input shaft or else coupled thereto via one or more interposed speed ratio stages, wherein the latter allows a more cost-effective design of the electric machine with higher rotational speeds and lower torque. The at least one speed ratio stage may in this case be designed as a spur gear stage and/or as a planetary stage.

If, by contrast, the electric machine is axially offset with respect to the planetary gear sets, a coupling is thus realized via one or more interposed speed ratio stages and/or a traction mechanism drive. The one or more speed ratio stages may in this case also be implemented specifically either as a spur gear stage or as a planetary stage. A traction mechanism drive may be either a belt drive or a chain drive.

In the case of a coaxial arrangement of the electric machine, it is particularly preferred if the first output shaft is guided through the rotor of the electric machine. This makes the transmission with electric machine particularly compact.

The static transmission ratio of the second planetary set can be calculated at least approximately from the reciprocal of the static transmission ratio of the first planetary gear set minus 1, that is to say:

$$i_{02} = \frac{1}{i_{01}} - 1.$$

In the event that the two planetary gear sets are designed as minus planetary gear sets (for example as per FIG. 2 or 3), this calculation rule has the effect that, if transmission losses are neglected, the output torque is respectively divided equally between the two output shafts. This is particularly advantageous if the invention is used for distributing the torque between two wheels on the same axle.

If a different torque distribution is desired or if the planetary gear sets are designed differently (for example FIGS. 4 to 9), a calculation rule can thus be defined analogously (FIG. 19). The wording "at least approximately" is used because, during operation under real conditions, the asymmetrical transmission losses in the direction of the two output shafts can have the effect that a slight deviation from the calculation rule is advantageous in order to obtain the same output torques at both shafts. Furthermore, this wording is used because it is sometimes not possible to exactly adhere to the calculation rule while adhering to integer numbers of teeth and favorable combinations of numbers of teeth, for example with regard to acoustic requirements.

The drive machine may be installed transversely with respect to a direction of travel. Furthermore, the two output shafts may be connected rotationally conjointly to the wheels of a vehicle.

It may furthermore be the case that the two output shafts distribute the introduced torque between different axles of a vehicle. An arrangement as a longitudinal transfer box (also called longitudinal transfer case) can thus be implemented, that is to say a transmission that distributes the introduced torque, for example, between multiple axles, in particular between a front axle and a rear axle of a vehicle.

The torque distribution of the transmission does not need to be uniform between the output shafts. In particular in the case of the embodiment as a longitudinal transfer box, a non-uniform distribution between one and the other axle may be realized. For example, the torque provided by the input shaft may be distributed such that 60% is directed to the rear axle and 40% to the front axle.

It has been found to be particularly advantageous if the first and the second planetary gear set is designed as a minus planetary gear set. These have good efficiency and can be arranged axially adjacent to one another and nested radially.

In the case of a combination of minus and plus planetary gear sets in a nested arrangement, the radially inner planetary gear set may be a minus planetary gear set and the radially outer planetary gear set may be a plus planetary gear set. Here, on the one hand, an easily implemented nesting capability is maintained. In addition, in this context, the fixed ring gear also offers the advantage that the (normally) relatively poor efficiency caused by the plus planetary gear set only affects one output shaft.

It is additionally possible for a transmission gearing or a multi-ratio transmission, preferably a 2-ratio transmission, to be connected upstream of the transmission. This transmission gearing or multi-ratio transmission may then also be a constituent part of the transmission and serves to configure an additional speed ratio by, for example, converting the rotational speed of the drive machine and driving the input shaft with this converted rotational speed. The multi-ratio transmission or transmission gearing may in particular be in the form of a planetary transmission.

The elements of the transmission may be designed as follows:

a) Transmission with two minus planetary gear sets, wherein
the first element of the first planetary gear set is a sun gear,
the second element of the first planetary gear set is a planet carrier and
the third element of the first planetary gear set is a ring gear, and wherein
the first element of the second planetary gear set is a sun gear,
the second element of the second planetary gear set is a planet carrier and
the third element of the second planetary gear set is a ring gear.

This transmission could be referred to as a first concept with two minus planetary gear sets.

b) Transmission with two minus planetary gear sets, wherein
the first element of the first planetary gear set is a sun gear,
the second element of the first planetary gear set is a ring gear and
the third element of the first planetary gear set is a planet carrier, and wherein
the first element of the second planetary gear set is a ring gear,
the second element of the second planetary gear set is a planet carrier and
the third element of the second planetary gear set is a sun gear.

This transmission could be referred to as a second concept with two minus planetary gear sets.

c) Transmission with two minus planetary gear sets, wherein
the first element of the first planetary gear set is a ring gear,
the second element of the first planetary gear set is a planet carrier and
the third element of the first planetary gear set is a sun gear, and wherein
the first element of the second planetary gear set is a sun gear,
the second element of the second planetary gear set is a planet carrier and
the third element of the second planetary gear set is a ring gear.

This transmission could be referred to as a fifth concept with two minus planetary gear sets.

d) Transmission with one plus and one minus planetary gear set, wherein the second planetary gear set is the minus planetary gear set, wherein
the first element of the first planetary gear set is a sun gear,
the second element of the first planetary gear set is a ring gear and
the third element of the first planetary gear set is a planet carrier, and wherein
the first element of the second planetary gear set is a sun gear,
the second element of the second planetary gear set is a planet carrier and
the third element of the second planetary gear set is a ring gear.

This transmission is, as it were, the first concept with one plus planetary gear set.

e) Transmission with one plus and one minus planetary gear set, wherein the first planetary gear set is the minus planetary gear set, wherein
the first element of the first planetary gear set is a sun gear,
the second element of the first planetary gear set is a planet carrier and
the third element of the first planetary gear set is a ring gear, and wherein
the first element of the second planetary gear set is a sun gear,
the second element of the second planetary gear set (P2) is a ring gear and
the third element of the second planetary gear set is a planet carrier.

This transmission is, as it were, the first concept with one plus planetary gear set.

f) Transmission with two plus planetary gear sets, wherein
the first element of the first planetary gear set is a sun gear,
the second element of the first planetary gear set is a ring gear and
the third element of the first planetary gear set is a planet carrier, and wherein
the first element of the second planetary gear set is a sun gear,
the second element of the second planetary gear set is a ring gear and
the third element of the second planetary gear set is a planet carrier.

This transmission is, as it were, the first concept with two plus planetary gear sets.

The torque vectoring superposition unit comprises an epicyclic transmission and two shift elements. The epicyclic transmission has at least four connection shafts. An at least first connection shaft is connected rotationally conjointly to the connecting shaft. An at least second connection shaft is connected rotationally conjointly to the first output shaft of the first planetary gear set. The two shift elements are configured to fix an at least third and fourth connection shaft to a non-rotatable structural element.

An epicyclic transmission is to be understood to mean an arrangement of one or more planetary gear sets with four connection shafts. It applies equally to all design variants of the epicyclic transmission that the first of these four connection shafts is connected rotationally conjointly to the connecting shaft, the second connection shaft is connected rotationally conjointly to the first output shaft of the first planetary gear set, and the third and fourth connecting shaft can be fixed to a non-rotatable structural element by a respective shift element.

Such a transmission combines the two functions of torque conversion and torque distribution in a single assembly. The transmission constitutes, so to speak, a combined transmission gearing and differential transmission, which on the one hand can implement a torque conversion with the aid of a housing support and on the other hand can implement the torque distribution to the output shafts. A torque vectoring superposition unit is additionally provided.

The static transmission ratio may in particular be selected such that the third connection shaft rotates in a first direction and such that the fourth connection shaft rotates in an opposite direction. The third and fourth connection shaft can each be fixed to a non-rotatable structural element, and thus prevented from rotating, independently of one another two shift elements. It is thus possible, depending on the actuation of the shift elements, for one of the output shafts of the transmission to be braked and, at the same time, for the torque at the respective other output shaft to be increased.

It is thus preferred if a first static transmission ratio of the epicyclic transmission is such that a rotational speed at the at least third connection shaft has a first sign;
  a second static transmission ratio of the epicyclic transmission is such that a rotational speed at the at least fourth connection shaft has a sign opposite to that of the third connection shaft,
  such that the at least third connection shaft of the epicyclic transmission has a first direction of rotation and the at least fourth connection shaft of the epicyclic transmission has a second direction of rotation opposite to the first direction of rotation.

The shift elements are preferably in the form of clutches, in particular in the form of brakes.

The static transmission ratio is preferably selected such that, when a vehicle is traveling straight ahead (that is to say both output shafts or the wheels of the vehicle are rotating at the same speed), the third and fourth connection shafts have a rotational speed close to zero, which results in a very low differential rotational speed in the respective shift elements. The differential rotational speed should however be non-zero in order to allow a distribution of torque even to a faster-rotating wheel.

The torque vectoring superposition unit is of technically low complexity in terms of construction, whereby costs can be reduced. Furthermore, the potential can be fully exploited by way of the connection of the epicyclic transmission to the connecting shaft. The potential of the application of force to the connecting shaft lies in the fact that the planetary gear set can be of simpler design owing to the different directions of rotation.

Furthermore, the torque vectoring superposition unit allows low differential rotational speeds in the shift elements.

In the context of the invention, the fact that two structural elements of the transmission or of the torque vectoring superposition unit are rotationally conjointly "connected" or "coupled" or "are connected to one another" refers to a permanent coupling of these components such that they cannot rotate independently of one another. In particular, no shift element is provided between these structural elements, which may be elements of the planetary gear sets and/or also shafts and/or a non-rotatable structural element of the transmission, but the corresponding structural elements are fixedly coupled to one another. A rotationally elastic connection between two structural parts is also understood to be conjoint or rotationally conjoint. In particular, a rotationally conjoint connection may also include joints, for example in order to allow a steering movement or a spring compression movement of a wheel.

What is preferred is a transmission with a torque vectoring superposition unit in the case of which the epicyclic transmission is provided in the form of two plus planetary gear sets. These two plus planetary gear sets are arranged coaxially with respect to the output shafts. One of the connection shafts is connected rotationally conjointly to the connecting shaft. Another connection shaft is connected rotationally conjointly to the output, in particular to the first output shaft. A third connection shaft of one and a fourth connection shaft of the other of these two planetary gear sets is connectable rotationally conjointly to a respective one of the two shift elements. The two planetary gear sets are connected to one another via a further connection shaft, and they are in particular connected to one another via a common planet gear carrier.

In a first exemplary embodiment in the variant with two plus planetary gear sets, the first connection shaft may be the planet carrier. The second connection shaft may in particular be a common sun gear. The third and fourth connection shafts may each be a ring gear. In a second exemplary embodiment, the first connection shaft may be a common sun gear. The second connection shaft may in particular be a common planet carrier. The third and fourth connection shafts may each be a ring gear.

Also preferred is a transmission with a torque vectoring superposition unit in the case of which the epicyclic transmission is of stepped-planet construction. The advantage of the stepped planet is that there is no need for two separate stepped planets, but these can be reduced to a triple stepped planet.

Depending on the requirements, one or more speed ratios, for example in the form of planetary gear sets and/or spur gear stages, may additionally be arranged between the torque vectoring superposition unit and the shift elements in order to increase the speed ratio. A transmission with a torque vectoring superposition unit is thus preferred in which a transmission gearing (UG), in particular in the form of at least one planetary transmission (P5, P6) or spur-gear transmission, is provided for applying a speed ratio to the rotational speed of the third and fourth connection shaft (W3, W4).

It is particularly preferred if a first transmission gearing is arranged between the third connection shaft and one of the two shift elements and a second transmission gearing is arranged between the fourth connection shaft and the other of the two shift elements.

If the input shaft of the transmission is connected to an electric machine, it is preferred if the torque vectoring superposition unit is arranged radially within a rotor of the electric machine. Alternatively, it is preferred if the torque vectoring superposition unit and the rotor of the electric machine are axially spaced apart from one another.

Preferred embodiments are listed below.

a) A transmission having a torque vectoring superposition unit, wherein the epicyclic transmission is in the form of a third and a fourth planetary gear set, wherein
- the third and fourth planetary gear sets are each configured as a plus planetary gear set,
- the sun gear of the third and of the fourth planetary gear set together form a second connection shaft,
- the planet carrier of the third and the fourth planetary gear set together form a first connection shaft,
- the ring gear of the third planetary gear set forms a third connection shaft and can be fixed by one of the two shift elements, and
- the ring gear of the fourth planetary gear set forms a fourth connection shaft and can be fixed by the other of the two shift elements (FIG. 20).

b) A transmission having a torque vectoring superposition unit, wherein the epicyclic transmission is in the form of a third and a fourth planetary gear set, wherein
- the third and fourth planetary gear sets are configured as plus planetary gear sets,
- the sun gear of the third and of the fourth planetary gear set together form a first connection shaft,
- the planet carrier of the third and the fourth planetary gear set together form a second connection shaft,
- the ring gear of the third planetary gear set forms a third connection shaft and can be fixed by one of the two shift elements, and
- the ring gear of the fourth planetary gear set forms a fourth connection shaft and can be fixed by the other of the two shift elements. (FIG. 21)

c) A transmission having a torque vectoring superposition unit, wherein the epicyclic transmission is in the form of a plus planetary gear set of stepped construction with three stages, wherein
- a planet carrier forms a first connection shaft,
- a sun gear of a first stage forms a second connection shaft,
- a sun gear of a second stage forms a third connection shaft and can be fixed by one of the two shift elements, and
- a sun gear of a third stage forms a fourth connection shaft and can be fixed by the other of the two shift elements. (FIG. 22)

d) A transmission having a torque vectoring superposition unit, wherein the epicyclic transmission is in the form of a plus planetary gear set of stepped construction with three stages, wherein
- a planet carrier forms a first connection shaft,
- a ring gear of a first stage forms a second connection shaft,
- a ring gear of a second stage forms a third connection shaft and can be fixed by one of the two shift elements, and
- a ring gear of a third stage forms a fourth connection shaft and can be fixed by the other of the two shift elements. (FIG. 23)

e) A transmission having a torque vectoring superposition unit, wherein the epicyclic transmission is in the form of a plus planetary gear set of stepped construction with three stages, wherein
- a planet carrier forms a second connection shaft,
- a sun gear of a first stage forms a first connection shaft,
- a sun gear of a second stage forms a third connection shaft and can be fixed by one of the two shift elements, and
- a sun gear of a third stage forms a fourth connection shaft and can be fixed by the other of the two shift elements. (FIG. 24)

f) A transmission with torque vectoring superposition unit, the epicyclic transmission being in the form of a plus planetary gear set in stepped construction with three steps, wherein
- a planet carrier forms a second connection shaft,
- a ring gear of a first stage forms a first connection shaft,
- a ring gear of a second stage forms a third connection shaft and can be fixed by one of the two shift elements, and
- a ring gear of a third stage forms a fourth connection shaft and can be fixed by the other of the two shift elements. (FIG. 25) According to two further aspects of the invention, a drivetrain having a transmission as described above and a vehicle having a transmission as described above are provided.

The invention is not restricted to the stated combination of the features of the main claim or of the claims dependent thereon. Possibilities additionally arise for combining individual features with one another, also insofar as they emerge from the claims, from the following description of preferred embodiments of the invention or directly from the drawings. The reference by the claims to the drawings through the use of reference designations is not intended to limit the scope of protection of the claims.

BRIEF DESCRIPTION OF THE DRAWINGS

Advantageous embodiments of the invention, which will be discussed below, are illustrated in the drawings. In the drawings:

FIGS. 1A-1E are schematic views of a vehicle;

FIGS. 2-7 each show a schematic view of an exemplary transmission that can be used with a torque vectoring superposition unit in the vehicle from FIGS. 1A-1C;

FIGS. 8-13 each show a schematic view of an exemplary drivetrain having a transmission with a torque vectoring superposition unit, as can be used in the vehicle from FIGS. 1A to 1C;

FIGS. 15-18 is a schematic illustration of the functional principle of the invention;

FIG. 19 is an overview of the static transmission ratios of; and

DETAILED DESCRIPTION OF THE PRESENTLY PREFERRED EMBODIMENTS

FIGS. 1A to 1E each show a schematic view of a transmission G, having a torque vectoring superposition unit which is not illustrated in any more detail, of a motor vehicle drivetrain 100 of a vehicle 1000 in the form of a passenger motor vehicle.

Figure 1A:
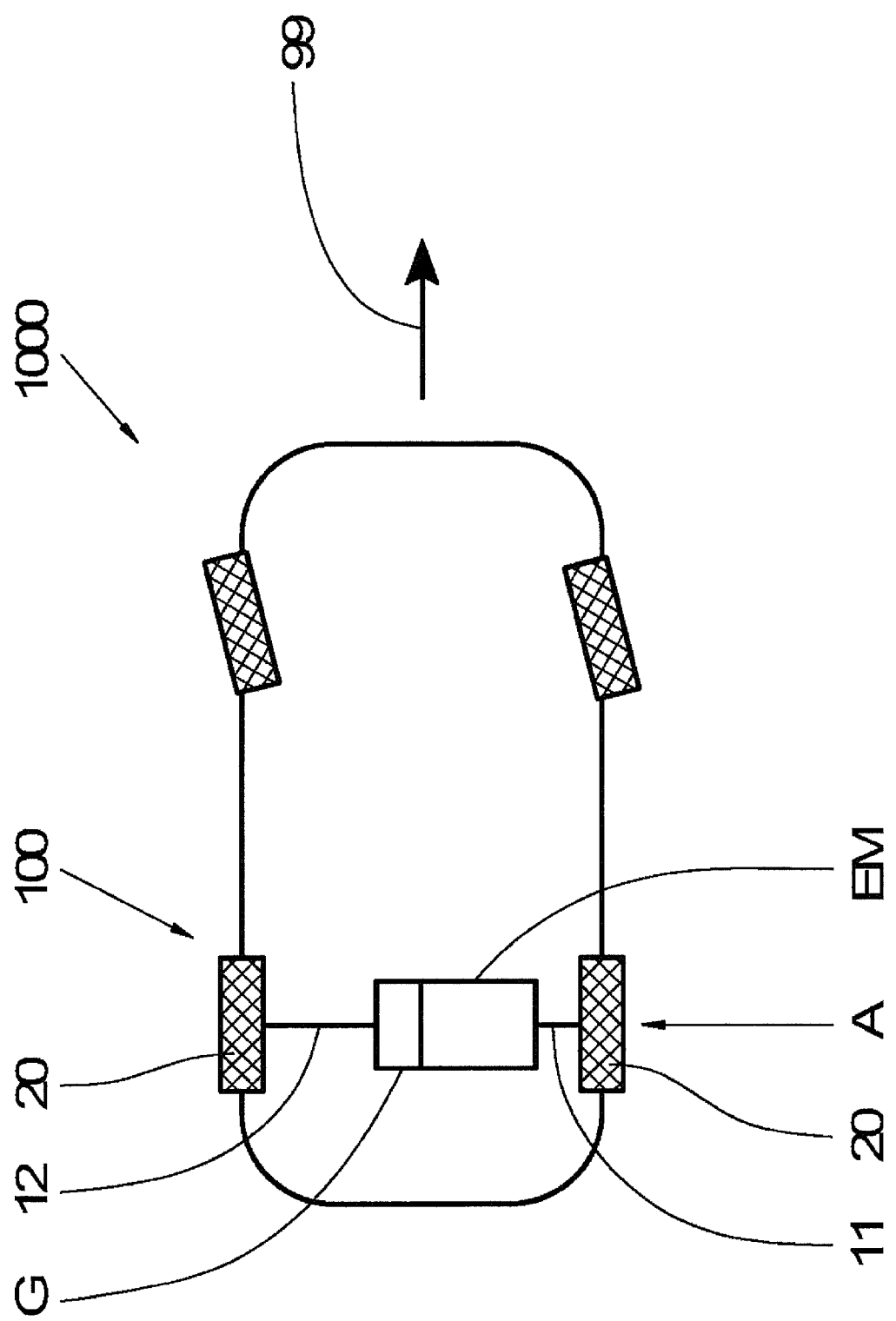

The drivetrain 100 as per FIG. 1A shows an electric drive which drives the rear axle A of the vehicle 1000. The drivetrain comprises a transmission G, which divides the drive torque of the electric machine EM between two output shafts 11 and 12. The transmission G and the electric machine are arranged in a common housing. The forward direction of travel is illustrated by arrow 99. As can also be seen in FIG. 1a, the transmission G and the electric machine EM are oriented transversely with respect to the direction of travel of the vehicle.

The drivetrain 100 as per FIG. 1b shows an internal combustion engine drive which drives the rear axle A of the vehicle 1000. The drivetrain comprises a transmission G, which divides the drive torque of the internal combustion engine VM between two output shafts 11 and 12, wherein a further transmission, for example an automatic transmission of the vehicle, is arranged between the transmission G and the internal combustion engine VM. The forward direction of travel is illustrated by arrow 99. As can also be seen in FIG. 1A, the transmission G and the internal combustion engine VM are oriented longitudinally with respect to the direction of travel of the vehicle.

Figure 1C:
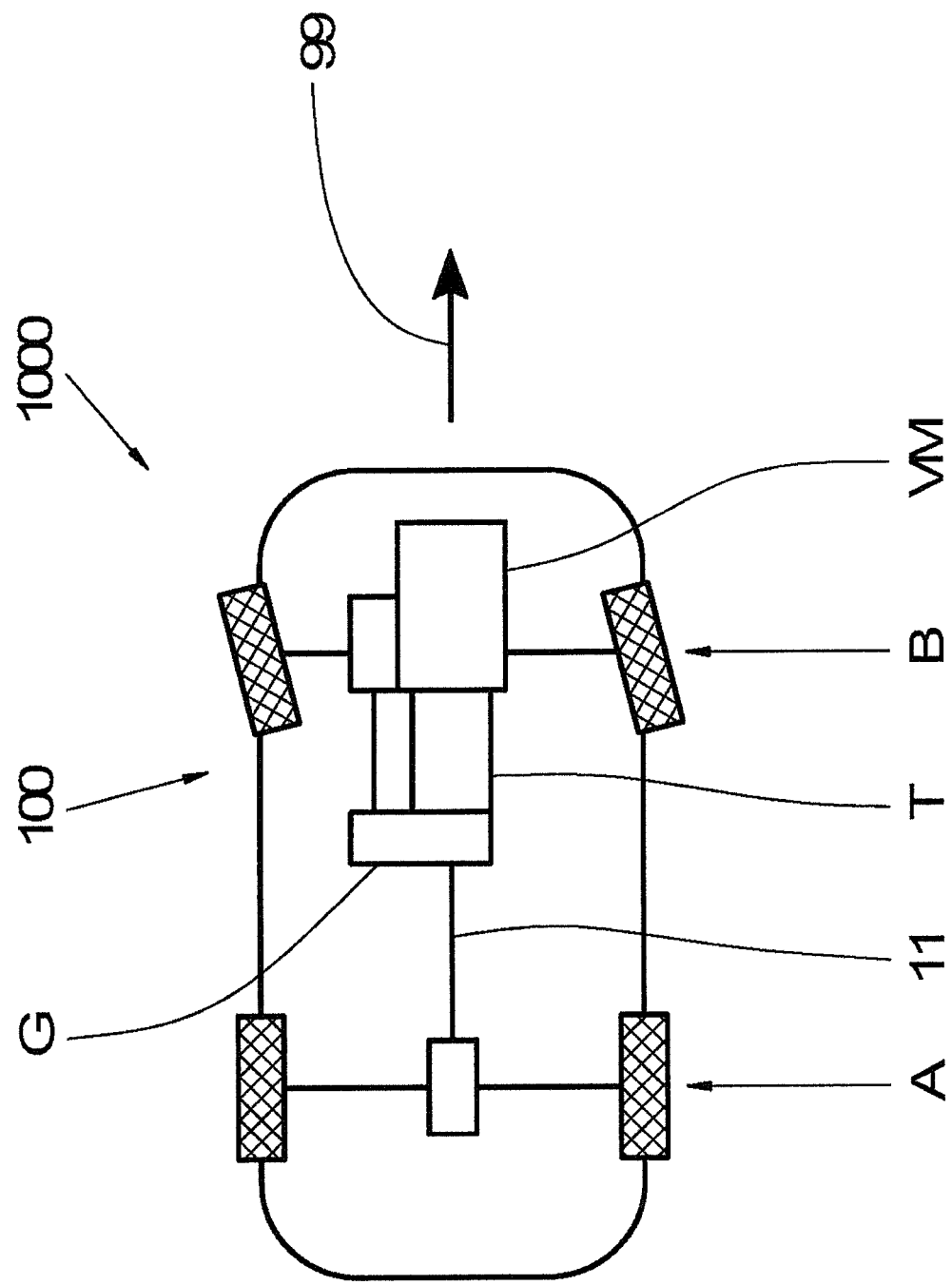

The drivetrain 100 as per FIG. 1C shows an internal combustion engine drive which drives the rear axle A and the front axle B of the vehicle 1000. The drivetrain comprises a transmission G, which divides the drive torque of the internal combustion engine VM between the axles A and B, wherein a further transmission, for example an automatic transmission of the vehicle, is arranged between the transmission G and the internal combustion engine VM. The transmission G may then be connected via an output shaft 11 to an axle differential of the rear wheel axle A and via an output shaft 12 to an axle differential of the front axle B. The forward direction of travel is illustrated by arrow 99. As can also be seen in FIG. 1C, the transmission G and the internal combustion engine VM are oriented longitudinally with respect to the direction of travel of the vehicle.

Figure 1D:
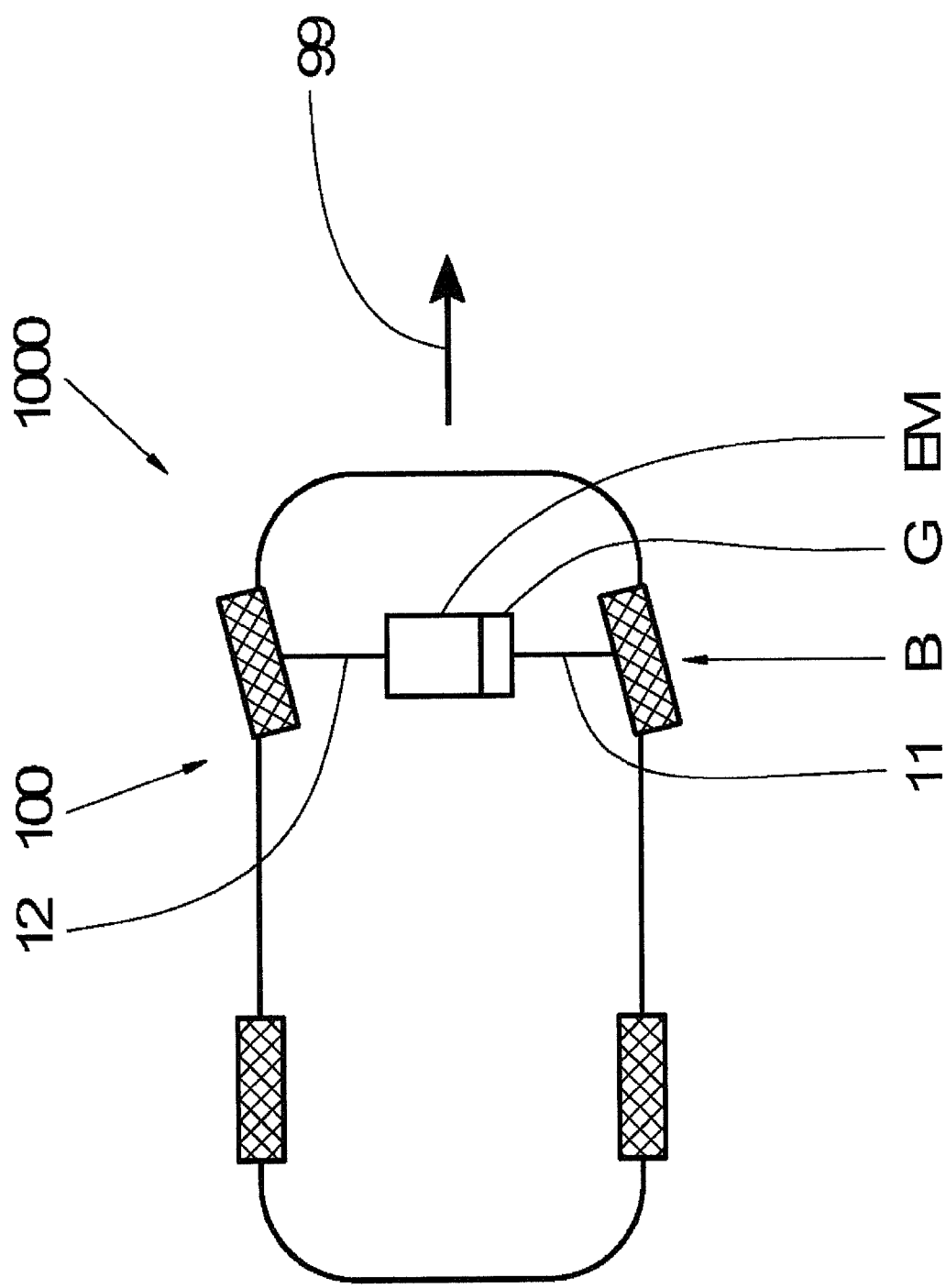

The drivetrain 100 as per FIG. 1D shows an electric drive which drives the front axle B of the vehicle 1000, that is to say an electric front transverse drive. The drivetrain comprises a transmission G, which divides the drive torque of the electric machine EM between two output shafts 11 and 12. The transmission G and the electric machine are arranged in a common housing. The forward direction of travel is illustrated by arrow 99. As can also be seen in FIG. 1D, the transmission G and the electric machine EM are oriented transversely with respect to the direction of travel of the vehicle.

Figure 1E:
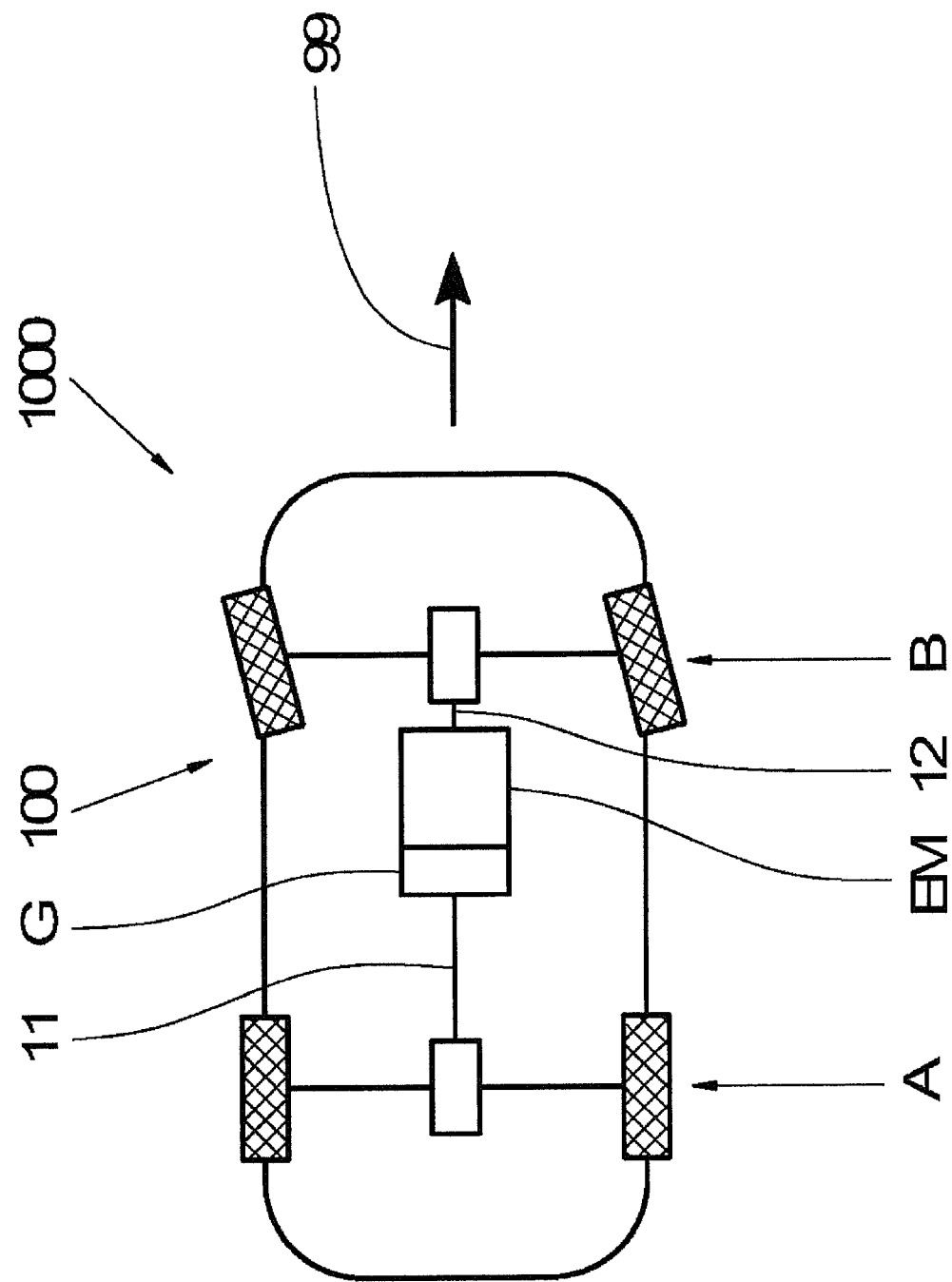

The drivetrain 100 as per FIG. 1E shows an electric all-wheel drive which drives the rear axle A and the front axle B of the vehicle 1000. This involves a transmission designed as a longitudinal transfer case. The drivetrain comprises a transmission G, which divides the drive torque of the electric machine EM between two output shafts 11 and 12. The output shaft 11 transmits the torque to the front axle B, whereas the output shaft 12 transmits the torque to the rear axle A. The respective torques are then in turn introduced into respective axle differentials. The transmission G and the electric machine are arranged in a common housing. The forward direction of travel is illustrated by arrow 99. As can also be seen in FIG. 1E, the transmission G and the electric machine EM are oriented transversely with respect to the direction of travel of the vehicle.

FIG. 2 shows a transmission G in a first exemplary embodiment. The transmission G comprises an input shaft 10, a first output shaft 11, a second output shaft 12, a first planetary gear set P1 and a second planetary gear set P2 which is connected to the first planetary gear set P1. In the present case, the planetary gear sets P1 and P2 are each designed as a minus planetary gear set. The planetary gear sets P1, P2 each comprise multiple elements E11, E21, E31, E12, E22, E32, wherein the first element E11 is a sun gear SO1, the second element E21 is a planet carrier PT1 and the third element E31 of the first planetary gear set P1 is a ring gear HO1. In the case of the second planetary gear set P2, the first element E12 is a sun gear SO2, the second element E22 is a planet gear carrier PT2 and the third element E32 is a ring gear HO2. The planet gear carriers PT1, PT2 each support multiple planet gears, which are illustrated but not designated. The planet gears mesh both with the respective radially inner sun gear and with the respective surrounding ring gear. The input shaft 10, the first output shaft 11 and the second output shaft 12 are arranged coaxially with respect to one another. The two planetary gear sets P1, P2 are likewise arranged coaxially with respect to one another.

In the present case, the input shaft 10 is connected rotationally conjointly to the first element E11. The first output shaft 11 is connected rotationally conjointly to the second element E21 of the first planetary gear set. The second output shaft 12 is connected rotationally conjointly to the third element E32 of the second planetary gear set. The third element E31 of the first planetary gear set P1 is connected rotationally conjointly to the first element E12 of the second planetary gear set P2, whereas the second element E22 of the second planetary gear set P2 is fixed to a non-rotatable structural element GG. The non-rotatable structural element GG is a transmission housing of the transmission G.

The third element E31, that is to say the ring gear HO1 of the first planetary gear set P1, and the first element E12, that is to say the sun gear SO2 of the second planetary gear set, form a common structural part, which in the present case is in the form of a connecting shaft or shaft 3.

As can be seen in FIG. 2, the input shaft 10, the first output shaft 11 and the second output shaft 12 are arranged coaxially with respect to one another. The two planetary gear sets P1, P2 are likewise arranged coaxially with respect to one another. According to this embodiment, the two planetary gear sets P1, P2 are arranged so as to be axially spaced apart from one another.

The input shaft 10 may be connected to a drive machine and thus introduce an input torque into the transmission G. That is to say, input shaft 10 and output shafts 11, 12 rotate in the same direction. Through the connection of the two planetary gear sets P1, P2 to one another and the support of the second element E22 on the housing GG, the introduced input torque can be distributed between the two output shafts 11, 12. In this case, the transmission performs not only the function of a transmission gearing but additionally that of a differential gear. That is to say, the introduced torque is not only subjected to a speed ratio but is also distributed between various output shafts. In this embodiment, no reversal of the direction of rotation occurs.

FIG. 3 shows a further exemplary embodiment of the transmission G. By contrast to the embodiment as per FIG. 2, the embodiment as per FIG. 3 shows a radially nested arrangement of the two planetary gear sets P1, P2. Whereas the embodiment as per FIG. 2 proposes an extremely radially compact solution, the embodiment as per FIG. 3 makes possible an extremely axially compact transmission G. The first planetary gear set P1 in this case forms the radially inner planetary gear set. The second planetary gear set P2 forms the radially outer planetary gear set. The first planetary gear set P1 is accordingly situated radially within the second planetary gear set P2. In this embodiment, too, the connection of the first ring gear HO1 of the first planetary gear set P1 to the sun gear SO2 of the second planetary gear set is configured as a single structural part, which in the present case is likewise in the form of a shaft 3. It is likewise the case in this embodiment that no reversal of the direction of rotation occurs.

Figure 4:
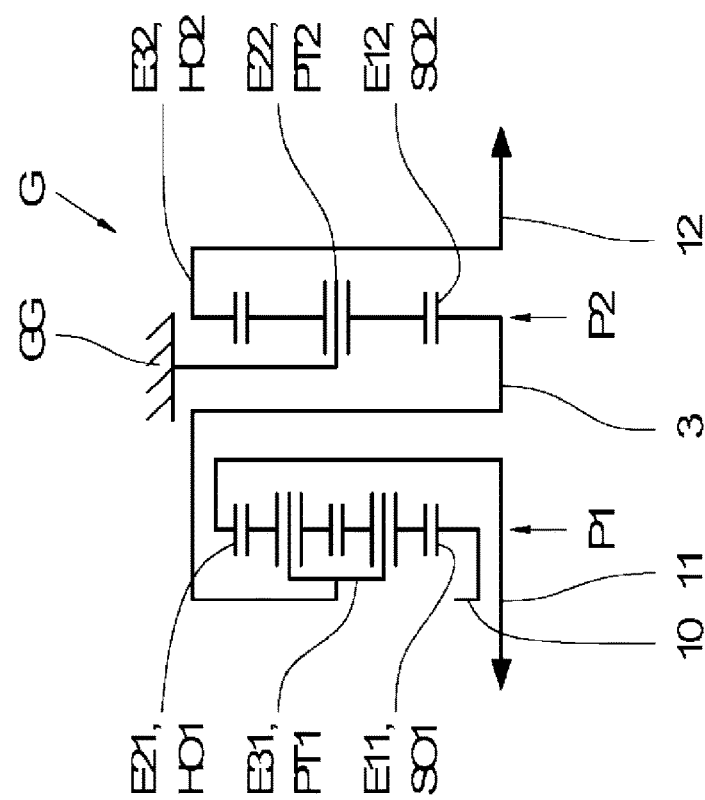

FIG. 4 shows a transmission G in a further exemplary embodiment. By contrast to FIG. 2, the first planetary gear set P1 is now configured as a plus planetary gear set. That is to say, the third element E31 of the first planetary gear set is configured as a planet gear carrier, which is connected rotationally conjointly to the first element E12 of the second planetary gear set, that is to say the sun gear SO2. The second element E21 is now configured as a ring gear HO1 and is connected rotationally conjointly to the first output shaft 11. The third element E31 of the first planetary gear set and the first element E12 of the second planetary gear set are in turn formed on the same structural part, which in the present case is in the form of a shaft 3. Reference is otherwise made to the statements relating to FIG. 2.

Figure 5:
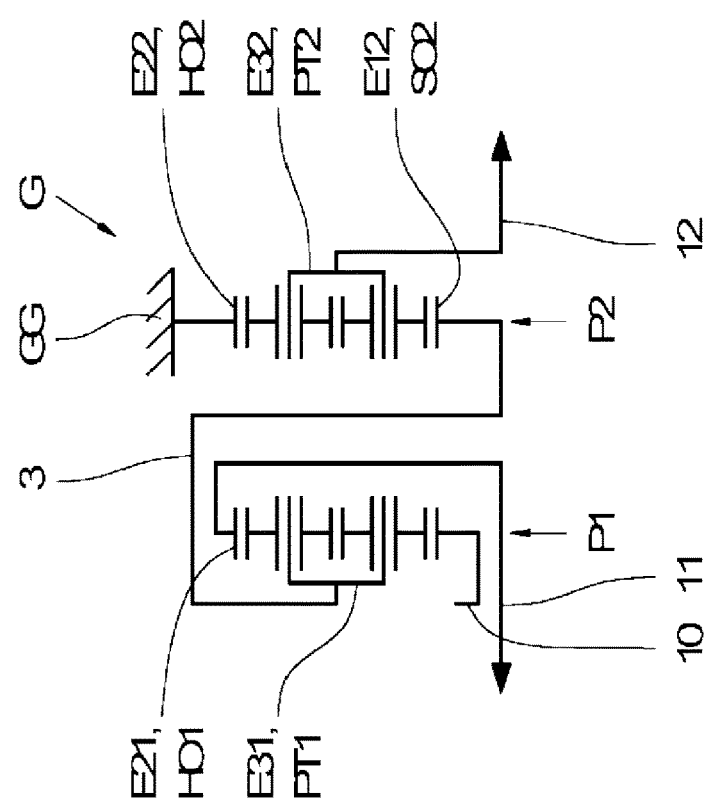

FIG. 5 shows a further exemplary embodiment of the transmission G. By contrast to the embodiment as per FIG. 2, it is now the case that both planetary gear sets P1, P2 are configured as plus planetary gear sets. Thus, the second element E21 is configured as a ring gear HO1 and is connected rotationally conjointly to the first output shaft 11. The third element E31 is now configured as a planet carrier PT1 and is connected rotationally conjointly to the first element E12, that is to say the sun gear SO2 of the second planetary gear set P2. The second element E22 of the second planetary gear set P2 is now configured as the ring gear HO2 and is fixed to the non-rotatable structural element GG. By contrast, the third element E32 of the second planetary gear set P2 is configured as a planet carrier PT2 and is connected rotationally conjointly to the second output shaft 12.

Thus, in the case of the two planetary gear sets P1, P2, the planet carrier and ring gear connections have been interchanged. Reference is otherwise made to the statements relating to FIG. 2.

Figure 6:
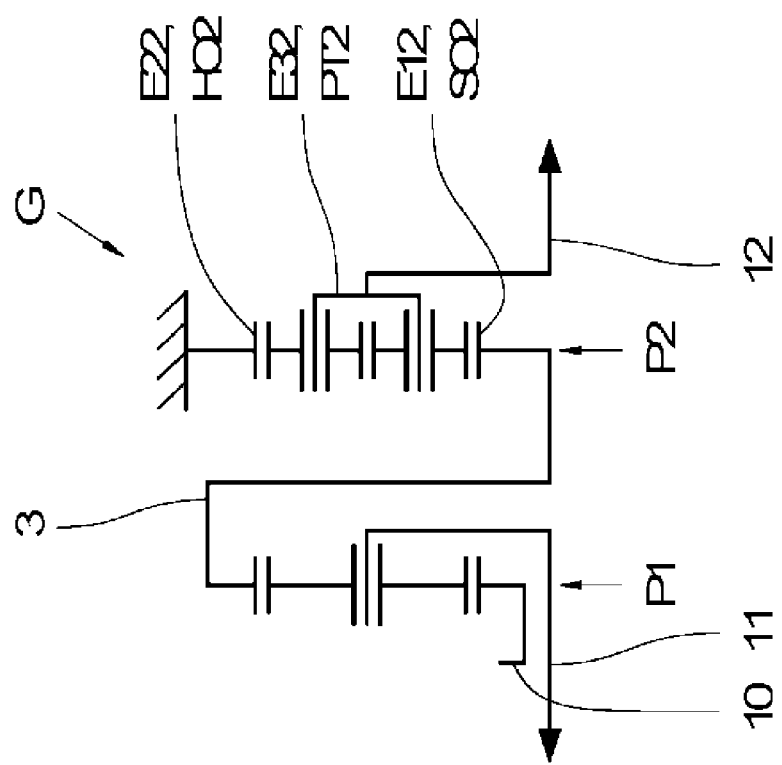

FIG. 6 shows a transmission in a further exemplary embodiment. By contrast to the embodiment as per FIG. 2, the second planetary gear set P2 is now configured as a plus planetary gear set, whereas the first planetary gear set P1 remains unchanged. Thus, the ring gear HO2 of the second planetary gear set P2 is fixed to the housing GG. In addition, the planet carrier PT2 is connected rotationally conjointly to the second output shaft 12. The planet carrier and ring gear connections of the second planetary gear set have thus been interchanged. Reference is otherwise made to the statements relating to FIG. 2.

Figure 7:
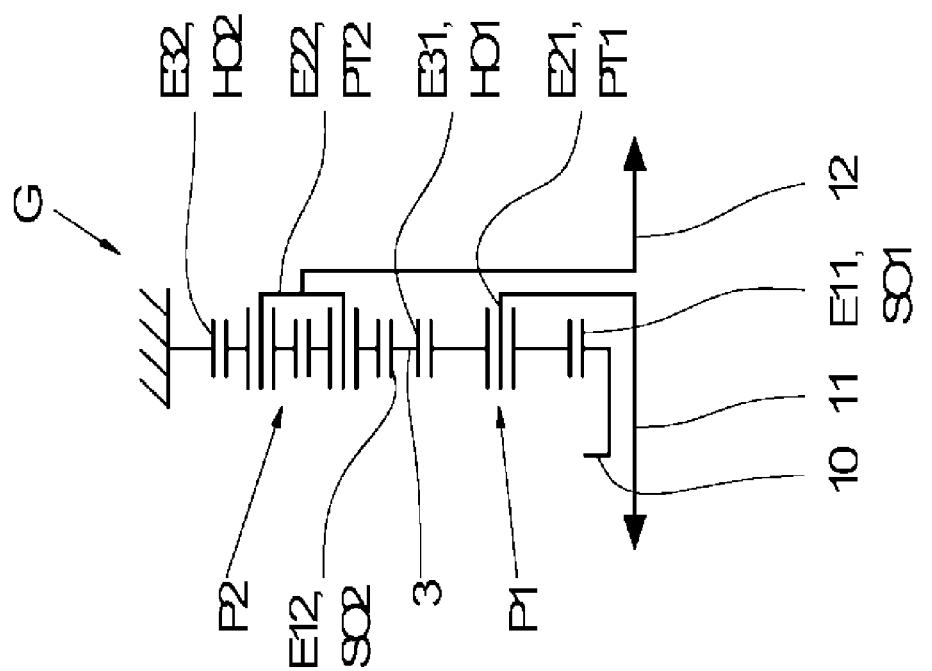

FIG. 7 shows a further exemplary embodiment of the transmission G. By contrast to the embodiment as per FIG. 6, the embodiment as per FIG. 7 provides radially nested planetary gear sets P1, P2. The planetary gear set situated radially at the inside is the first planetary gear set P1. The planetary gear set situated radially at the outside is the second planetary gear set P2. Reference is otherwise made to the statements relating to FIGS. 6 and 2.

FIG. 8 shows the transmission G in a further exemplary embodiment. This embodiment has the following differences in relation to the embodiment as per FIG. 2. Firstly, a drive machine in the form of an electric machine EM is provided. The electric machine EM comprises a stator S, which is fixed to the housing, and a rotor R. The rotor R of the electric machine EM is connected rotationally conjointly to the first element E11, that is to say the sun gear SO1 of the first planetary gear set. A further difference is that the second element E21 of the first planetary gear set is configured as a ring gear HO1 and is connected rotationally conjointly to the first output shaft 11. Furthermore, the third element E31 of the first planetary gear set P1 is configured as a planet carrier PT1 and is connected rotationally conjointly to the first element E12 of the second planetary gear set P2, which in the present case is configured as a ring gear HO2. The second element E22 of the second planetary gear set is furthermore configured as a planet carrier PT2 and is fixed to the housing GG. Accordingly, the third element E32 is configured as a sun gear SO2 and is connected rotationally conjointly to the second output shaft. In this exemplary embodiment, a reversal of the direction of rotation of the input rotational speed occurs. Nesting of the planetary gear sets P1, P2 is not possible in this embodiment.

In other words, the torque continues to be introduced via the sun gear SO1 of the first planetary gear set P1, whereas the output is ensured via the ring gear HO1. By contrast to the situation in FIG. 2, the planet carrier of the first planetary gear set P1 is now connected rotationally conjointly to the ring gear HO2 of the second planetary gear set. By contrast to the embodiment as per FIG. 2, the output of the second planetary gear set accordingly takes place via the sun gear SO2.

Figure 9:
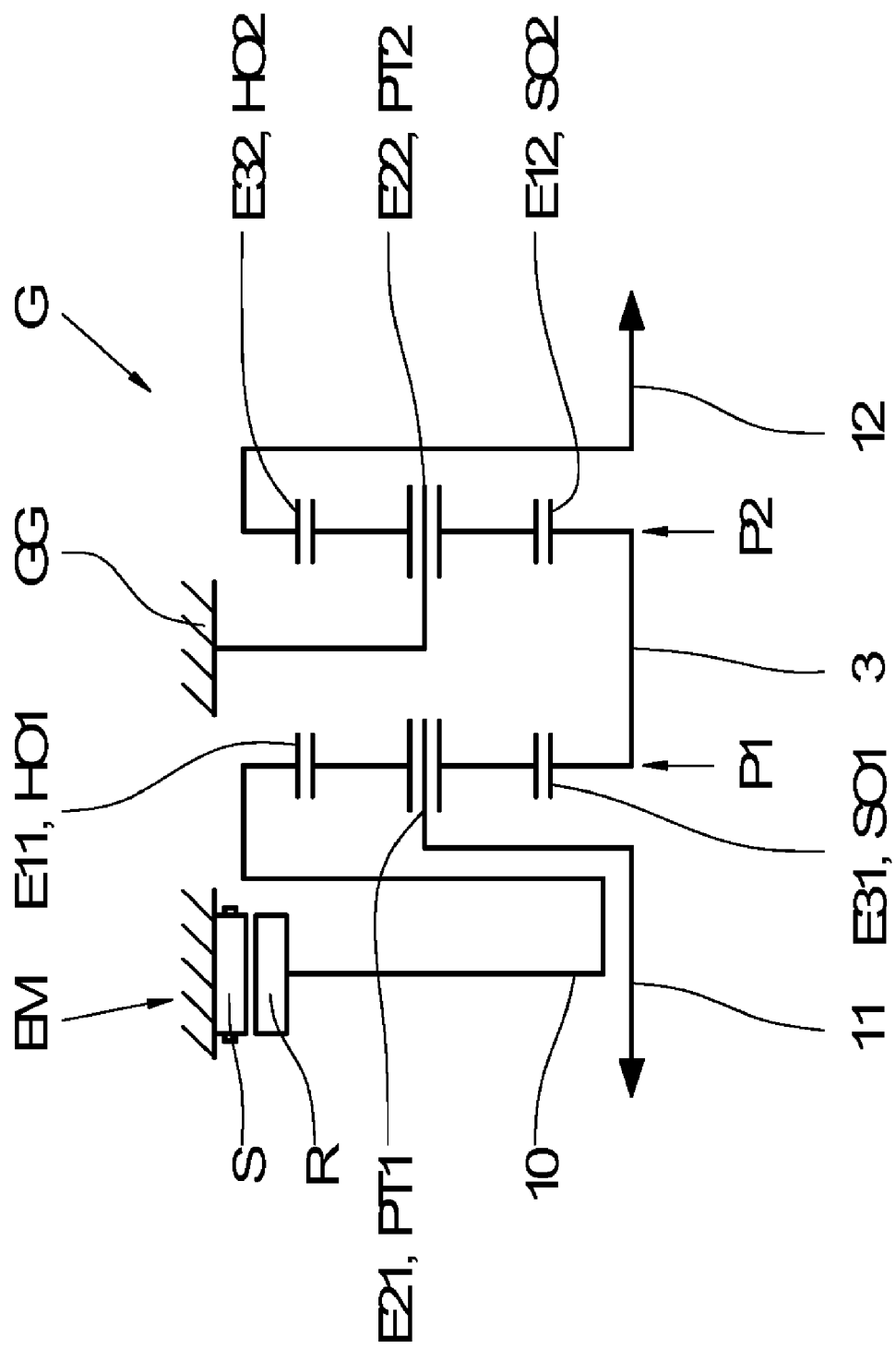

FIG. 9 shows a further exemplary embodiment of the transmission G. The embodiment has the following differences in relation to the embodiment as per FIG. 2. Firstly, a drive machine in the form of an electric machine EM is provided, which has a stator S, which is fixed to the housing, and a rotor R. The rotor R is connected rotationally conjointly to the input shaft 10, which in turn is connected to the first element E11, which in the present case is configured as a ring gear HO1, of the first planetary gear set P1. The first output shaft 11 is in the present case connected to the second element E21, which in the present case is in the form of a planet carrier PT2, of the first planetary gear set P1. The third element E31 of the first planetary gear set P1, which in the present case is configured as a sun gear SO1, is connected rotationally conjointly to the first element E12, that is to say the sun gear SO2 of the second planetary gear set P2. The other elements of the second planetary gear set remain unchanged.

By contrast to the embodiment as per FIG. 2, it is the case in the embodiment as per FIG. 9 that the introduction of the torque takes place via the ring gear HO1 of the first planetary gear set P1, whereas the output of the first planetary gear set P1 continues to be realized via the planet carrier PT1. By contrast to FIG. 2, the two planetary gear sets P1, P2 are connected via a common sun gear, which in the present case is in the form of a shaft 3.

Figure 9A:
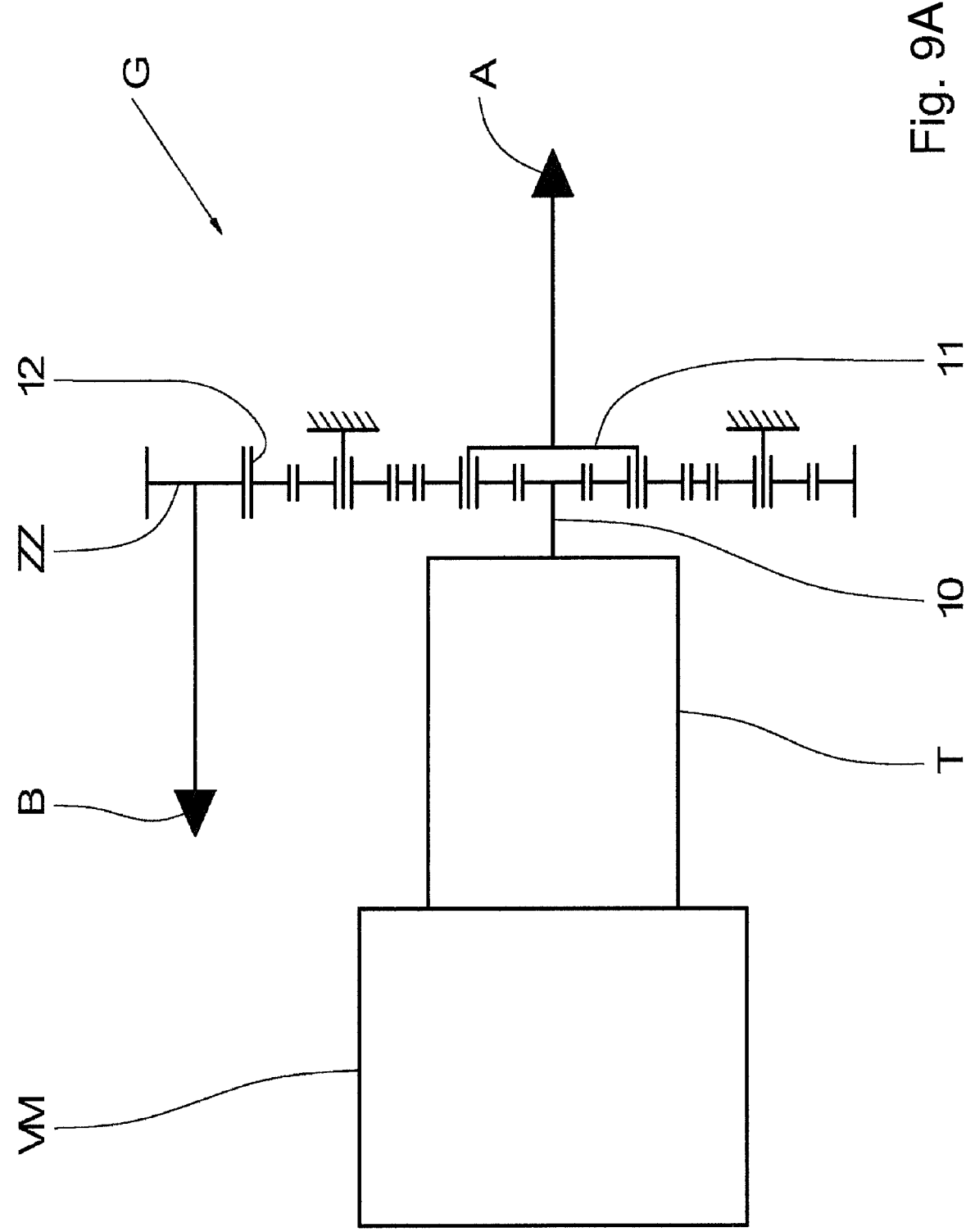

FIG. 9A shows a specific embodiment of the transmission G for the drivetrain from FIG. 1c. Output 12 transmits the torque to the rear axle A. Output 11 transmits the torque to the front axle B. As can be clearly seen, the output shafts 11, 12 are arranged axially parallel with respect to one another—and not coaxially with respect to one another. The second output shaft 12 of the second planetary gear set P2 meshes with an intermediate toothed gear ZZ, which in turn is connected to a shaft which in turn introduces the torque into a rear-axle differential (not illustrated).

Figure 10:
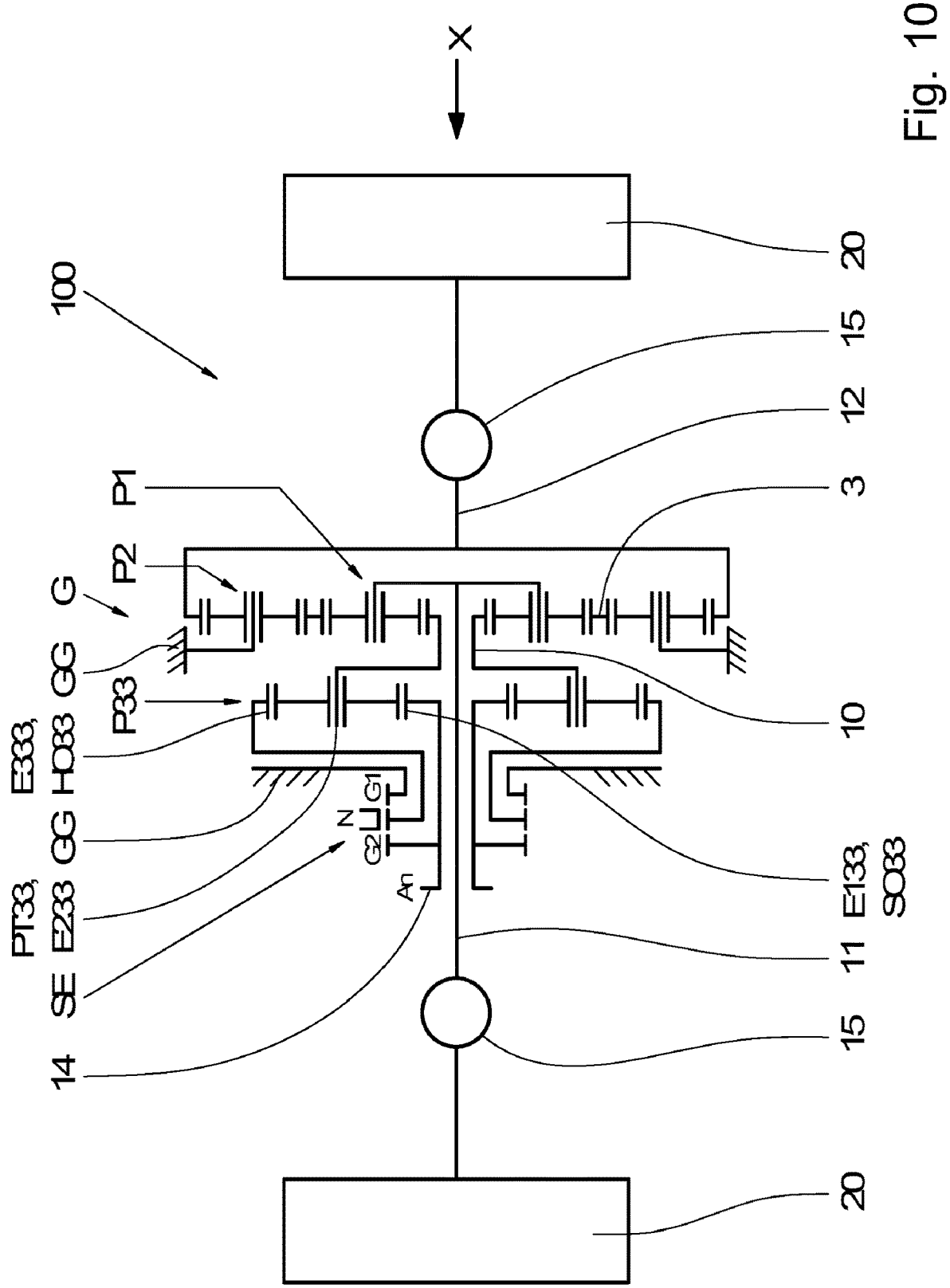

FIG. 10 shows a drivetrain 100 of a vehicle with a transmission in an exemplary embodiment, wherein a transmission gearing in the form of a planetary gear P33 is additionally connected upstream of the transmission G.

The transmission G is the embodiment as per FIG. 3, to which reference is hereby made. The planetary gear set P33 is configured as a minus planetary gear set and has a first element E133, which is configured as a sun gear, a second element E233, which is configured as a planet carrier, and a third element E333, which in the present case is configured as a ring gear HO33. The second element E233 of the additional planetary gear set P33 is connected rotationally conjointly to the input shaft 10 of the transmission G.

Furthermore, a shift element SE is assigned to the planetary transmission P33. The shift element SE is configured to fix the third element E333 to the non-rotatable structural element GG. Furthermore, the shift element SE is configured to, in a second shift position, connect the third element E333 to the first element E133 of the planetary gear set P33, that is to say to place these in a block state. If a planetary gear set is in a block state, the speed ratio is always 1, regardless of the number of teeth. In other words, the planetary gear set revolves as a block. In a third shift position, the third element E333 is not fixed to the housing, nor is the planetary gear set P33 in a block state. The shift element SE is in this case present in a neutral shift position. The first shift position of the shift element SE is denoted by the reference designation G1, which at the same time represents a first gear ratio stage. The second shift position is denoted by the reference designation G2, which at the same time represents a second gear ratio stage. The first element E13 of the planetary gear set P3 is connected via an input shaft 14 to a drive machine (not illustrated). If the shift element SE is in its neutral position, the drive torque introduced into the transmission gearing P33 is not transmitted to the input shaft 10 of the transmission G.

As can also be clearly seen from FIG. 10, the transmission gearing P33 is arranged coaxially with respect to the input shaft 10 and with respect to the output shafts 11, 12. In addition, it can be clearly seen how the first output shaft 11 is guided through the input shaft 10 designed as a hollow shaft and, over the further course, through the further shaft 14 designed as a hollow shaft. The two output shafts 11, 12 are each connected to a drive wheel 20. Vibration dampers 15 are provided in order to absorb the vibrations of the vehicle.

Figure 11:
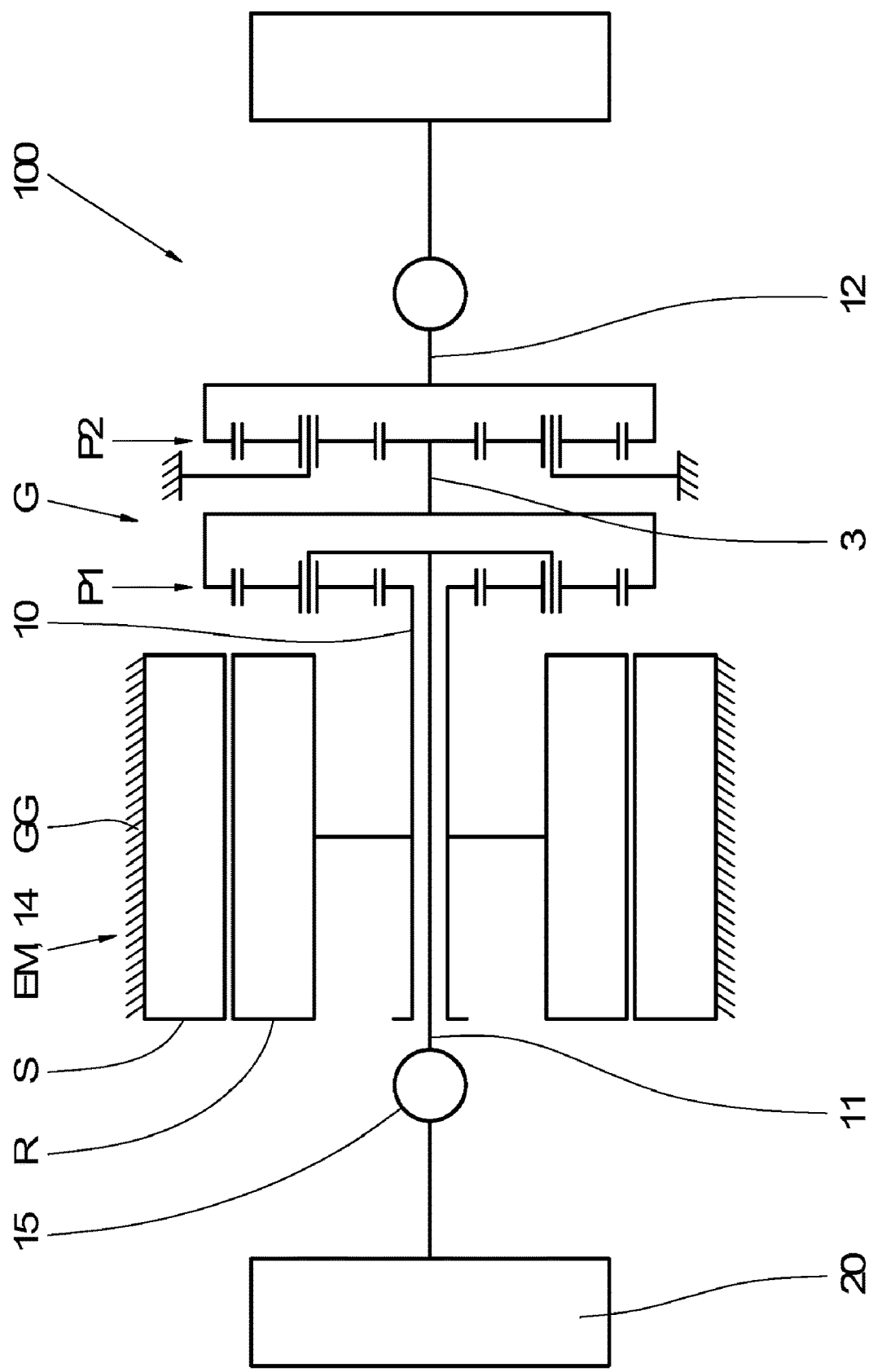

FIG. 11 shows a drivetrain of a vehicle having a transmission in a further exemplary embodiment. The transmission G is the preferred embodiment as per FIG. 2, to which reference is made. By contrast to FIG. 10, no transmission gearing is connected upstream in the embodiment as per FIG. 11. The drive machine is configured as an electric machine EM. The electric machine EM has a stator S, which is fixed to the housing, and a rotor R. The rotor R is connected rotationally conjointly to the input shaft 10. As can be clearly seen, the electric machine EM is arranged coaxially with respect to the input shaft 10 and with respect to the output shafts 11, 12. In addition, said electric machine is thus arranged coaxially with respect to the planetary gear sets P1, P2. The input shaft 10 is configured as a hollow shaft through which the first output shaft 11 is guided. Reference is otherwise made to the statements relating to FIG. 10.

Figure 12:
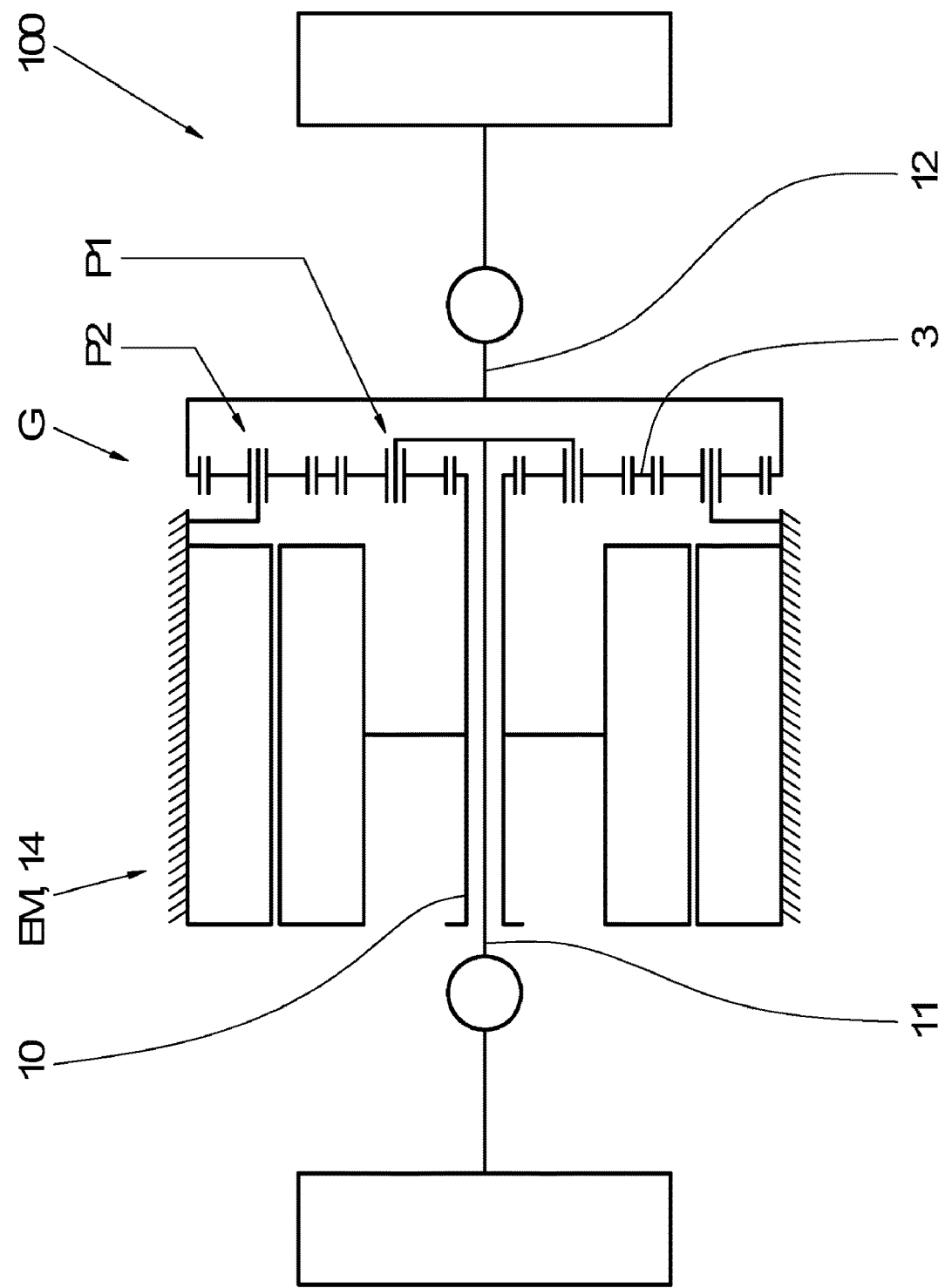

FIG. 12 shows a further drivetrain 100 with a transmission G in an exemplary embodiment. By contrast to the embodiment as per FIG. 11, the planetary gear sets P1, P2 are arranged not axially adjacent to one another but radially one above the other, that is to say in nested fashion. The transmission G is thus the preferred embodiment from FIG. 3. Reference is otherwise made to the statements relating to FIG. 11 and FIG. 3.

Figure 13:
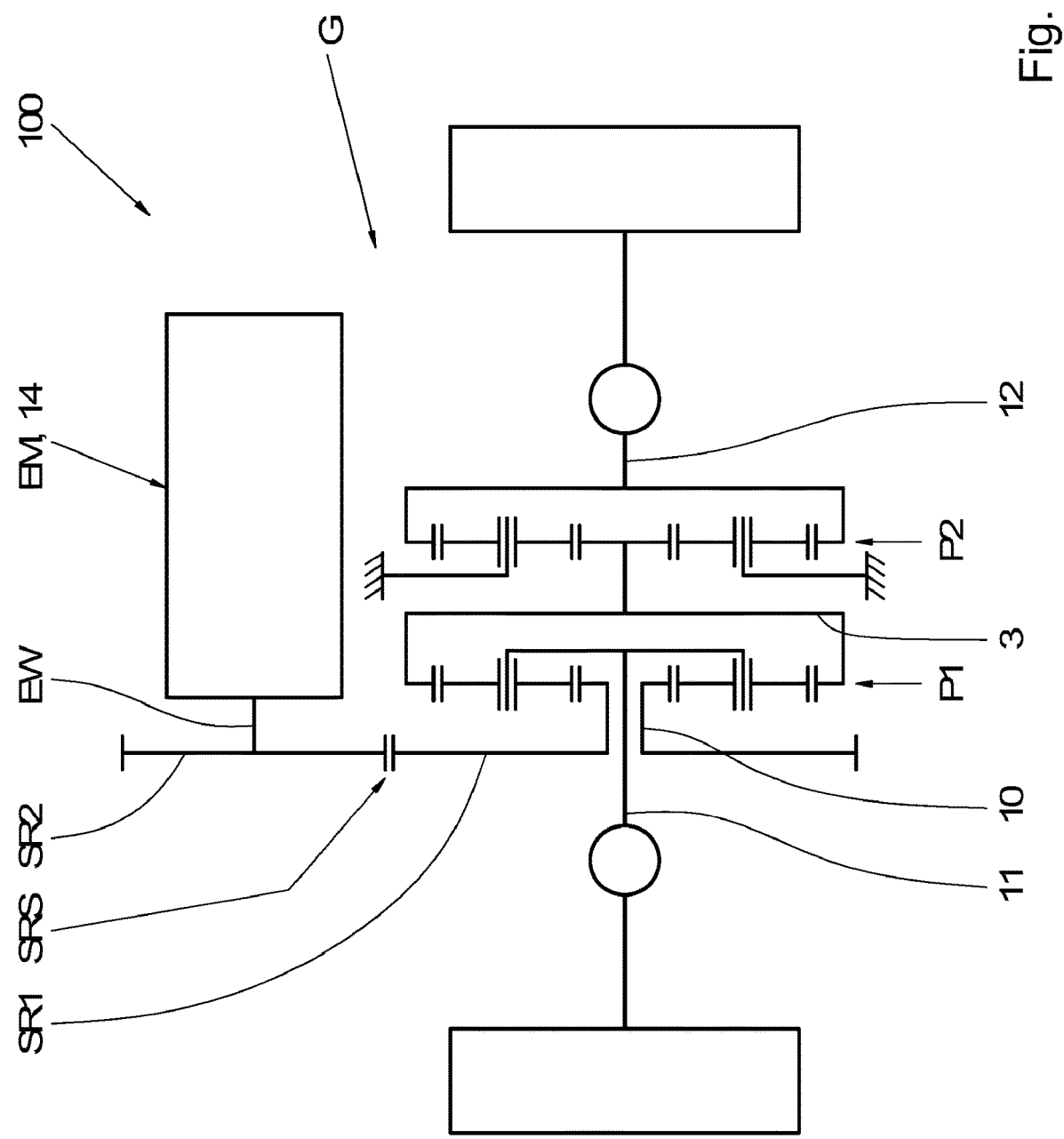

FIG. 13 shows a drivetrain 100 in a further exemplary embodiment. This embodiment is similar to the embodiment as per FIG. 11, wherein, by contrast thereto, the electric machine EM is arranged not coaxially but axially parallel with respect to the transmission G. A connection is realized here via a spur gear stage SRS, which is composed of a first spur gear SR1 and a second spur gear SR2. The first spur gear SR1 is in this case connected rotationally conjointly to the input shaft 10. The spur gear SR1 is then in tooth meshing engagement with the spur gear SR2, which is located rotationally conjointly on an input shaft EW of the electric machine EM and which, within the electric machine EM, produces the connection to the rotor (not illustrated in any more detail here) of the electric machine EM. Otherwise, the embodiment as per FIG. 13 corresponds to the embodiment as per FIG. 11, such that reference is made to the description given with regard thereto.

Figure 14:
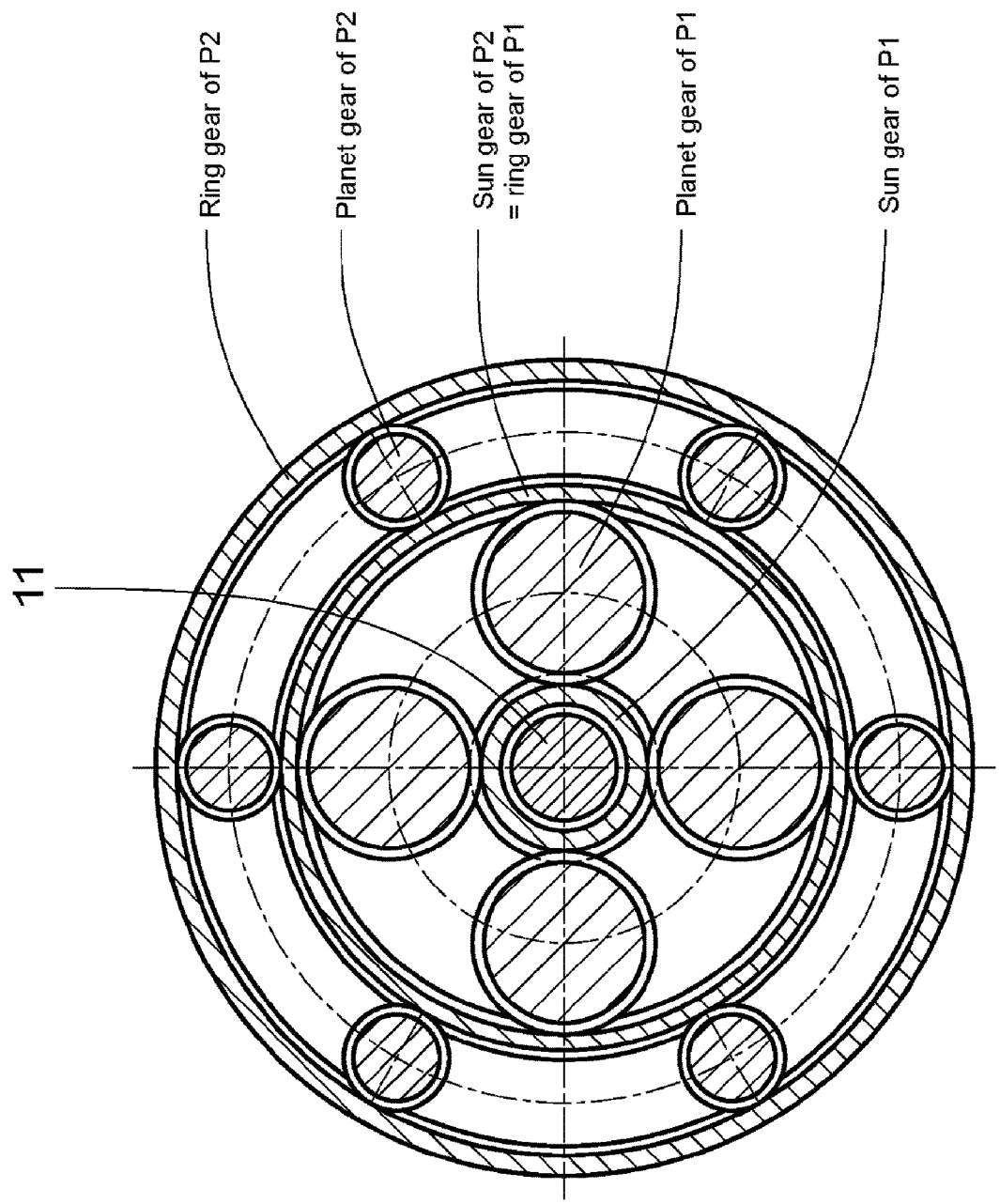
FIG. 14 is FIG. 3 in a sectional view.

FIG. 14 shows the preferred embodiment of the transmission G as per FIG. 3 in a sectional view. The shaft situated in the center is the output shaft 11. In this drawing, the input shaft 10 coincides with the sun gear of P1, that is to say, in other words, the input shaft 10 is connected to a sun gear of the first planetary gear set P1. The sun gear of the first planetary gear set P1 is in turn in tooth meshing engagement with planet gears of the first planetary gear set P1. The planet gears of the first planetary gear set P1 in turn mesh with the surrounding ring gear of the first planetary gear set P1, wherein the ring gear simultaneously forms the sun gear of the second planetary gear set P2. The sun gear of the second planetary gear set P2 is in turn in tooth meshing engagement with planet gears of the second planetary gear set P2. The planet gears of the second planetary gear set P2 are in turn in tooth meshing engagement with the ring gear, which surrounds the planet gears, of the second planetary gear set P2.

Figure 16:
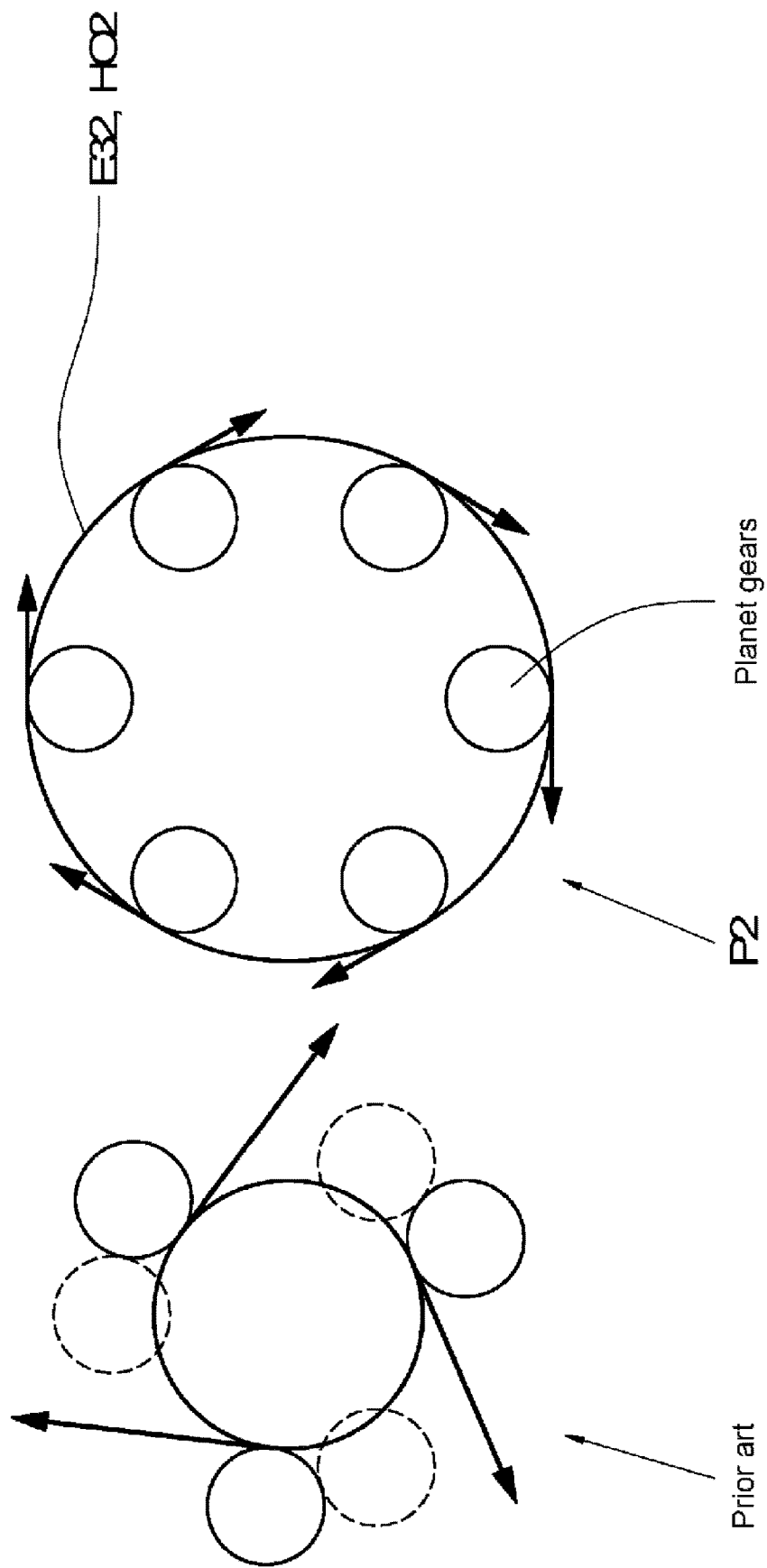

The following FIGS. 15 to 17 show the introduction of force and force support configurations of the invention in relation to the prior art, such as DE 10 2011 079 975 A1. The prior art is compared with the preferred embodiment with two minus planetary transmissions, as have been described inter alia in FIGS. 2 and 3. However, this consideration also applies analogously to the other embodiments.

The following generally applies to FIGS. 15 to 17:

At the first planetary gear set P1, the torque of the input shaft 10 is converted into the output torque for the first output 11. The third element E31 of the first planetary gear set P1 (which is at the same time the first element E12 of the second planetary gear set P2) is driven backward by its reaction moment. The backward movement of the third element E31 is permitted, such that a proportion of the mechanical drive power (preferably 50% in the case of the transverse differential and straight-ahead travel) is conducted through the first planet set P1 into the second planet set.

Furthermore, the backward rotation causes the speed ratio with respect to the first output (11) to be increased (static transmission ratio i0=−3 would allow only a speed ratio of i=4 in the case of a fixed ring gear).

In the second planetary set P2, the direction of rotation (backward) introduced at the first element (E12) is, with the aid of a housing support (E22), reversed (forward) into the output movement of the second output (12). Here, the torque introduced into the second planetary set P2 and the torque conducted out to the second output (12) are summed to give the housing support torque. Here, the second planetary set P2 transmits only that proportion of the mechanical power that is conducted to the second output (12) (typically 50%). Only a proportion of the power is applied to the second planetary set P2, such that the overall efficiency is positively influenced.

In the prior art, a torque conversion usually takes place with the aid of a housing support. The reaction moment of the transmission gearing is in this case conducted directly into the housing and does not serve to generate the second output torque. The result is that a transmission must firstly be configured for the sum torque of the two output shafts (generally double the torque). A separate differential transmission is then required to divide this sum torque, which is not required in this form at any location, into two output torques again.

The individual FIGS. 15 to 18 specifically show the following:

FIG. 15 schematically shows the first planetary gear set P1 of the transmission G (right) and a first stage of the spur gear differential from the prior art (left). The introduction of force from the planet gears to the sun gear takes place in parallel via 3 static, that is to say fixed, tooth meshing engagement points. The output to the first output shaft takes place via the sun gear.

By contrast to this, the introduction of force according to the preferred embodiment takes place in parallel via eight moving, that is to say rotating, tooth meshing engagement points. There are four tooth meshing engagement points between sun gear SO1 and four planet gears. Four further tooth meshing engagement points act between a respective planet gear and the ring gear HO1 (not illustrated). The output to the first output shaft 11 takes place via the planet gear carrier PT1. The technical effect lies in the significantly lower tooth forces that act on the first planetary gear set.

FIG. 16 schematically shows the second planetary gear set P2 of the transmission G (right) and a second stage of the stepped planet from the prior art (left). The introduction of force from the planet gears to the sun gear takes place in parallel via 3 static, that is to say fixed, tooth meshing engagement points. The output to the second output shaft takes place via the sun gear.

By contrast to this, the introduction of force into the second planetary gear set P2 according to the preferred embodiment takes place in parallel via 6 moving, that is to say rotating, tooth meshing engagement points. The six tooth meshing engagement points act in each case between one of the six planet gears and the ring gear HO2. The fixed planet carrier PT2, which carries the six planet gears and the sun gear SO2, are not illustrated. The output to the second output shaft 12 takes place via the ring gear HO2. The technical effect lies in the significantly lower tooth forces that act on the second planetary gear set owing to the larger effective diameter and owing to the larger possible number of planets.

FIG. 17 schematically shows the introduction of the supporting torque into the housing. The introduction of force in the case of the stepped planet according to the prior art (left) takes place into a fixed ring gear via 3 parallel tooth meshing engagement points.

The introduction of force according to the preferred embodiment takes place into the fixed planet carrier PT2 via 12 parallel tooth meshing engagement points. Six tooth meshing engagement points act between the sun gear SO2 and the six planet gears of the second planetary gear set. The six other tooth meshing engagement points act between each planet gear of the second planetary gear set and the ring gear HO2. The technical effect lies in the significantly lower tooth forces that act on the second planet carrier PT2.

Figure 18:
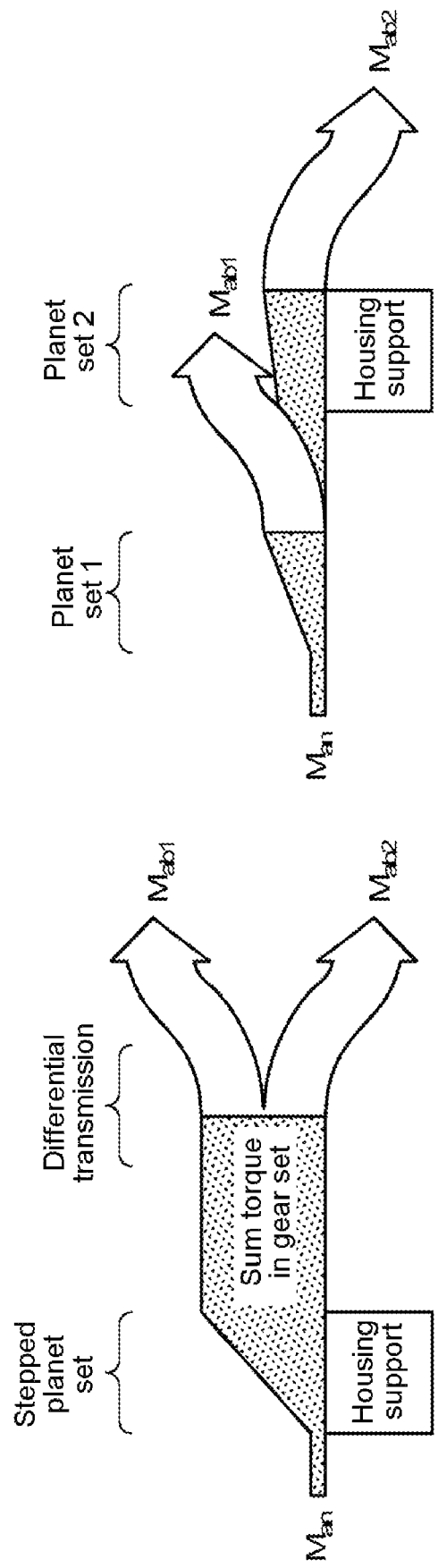

FIG. 18 shows the principle illustrated in more detail in FIGS. 15 to 17 in a further view. The figure symbolically illustrates the torques in terms of magnitude on their path through the transmission. Directions of rotation are not apparent from this.

The stepped planet set according to the prior art (left) generates the full output torque, that is to say the sum torque of both wheels, from one input torque Man. The differential divides this high moment into two half wheel moments $M_{an1}$ and $M_{an2}$.

The greatest torque in the gear set according to the invention (right) corresponds to the output torque of a single gear. Only the housing support has a high torque factor in accordance with physical principles.

FIG. 19 gives an overview of the calculation rule for the static transmission ratio of the individual embodiments. These each give rise, if transmission losses are neglected, to an output torque of equal magnitude and with the same sign at both output shafts 11, 12. $i_{01}$ denotes the static transmission ratio of the first planetary gear set P1. $i_{02}$ denotes the static transmission ratio of the second planetary gear set P2. One of the planetary gear set configurations with corresponding static transmission ratio may be selected depending on the use of the transmission.

Figure 20:
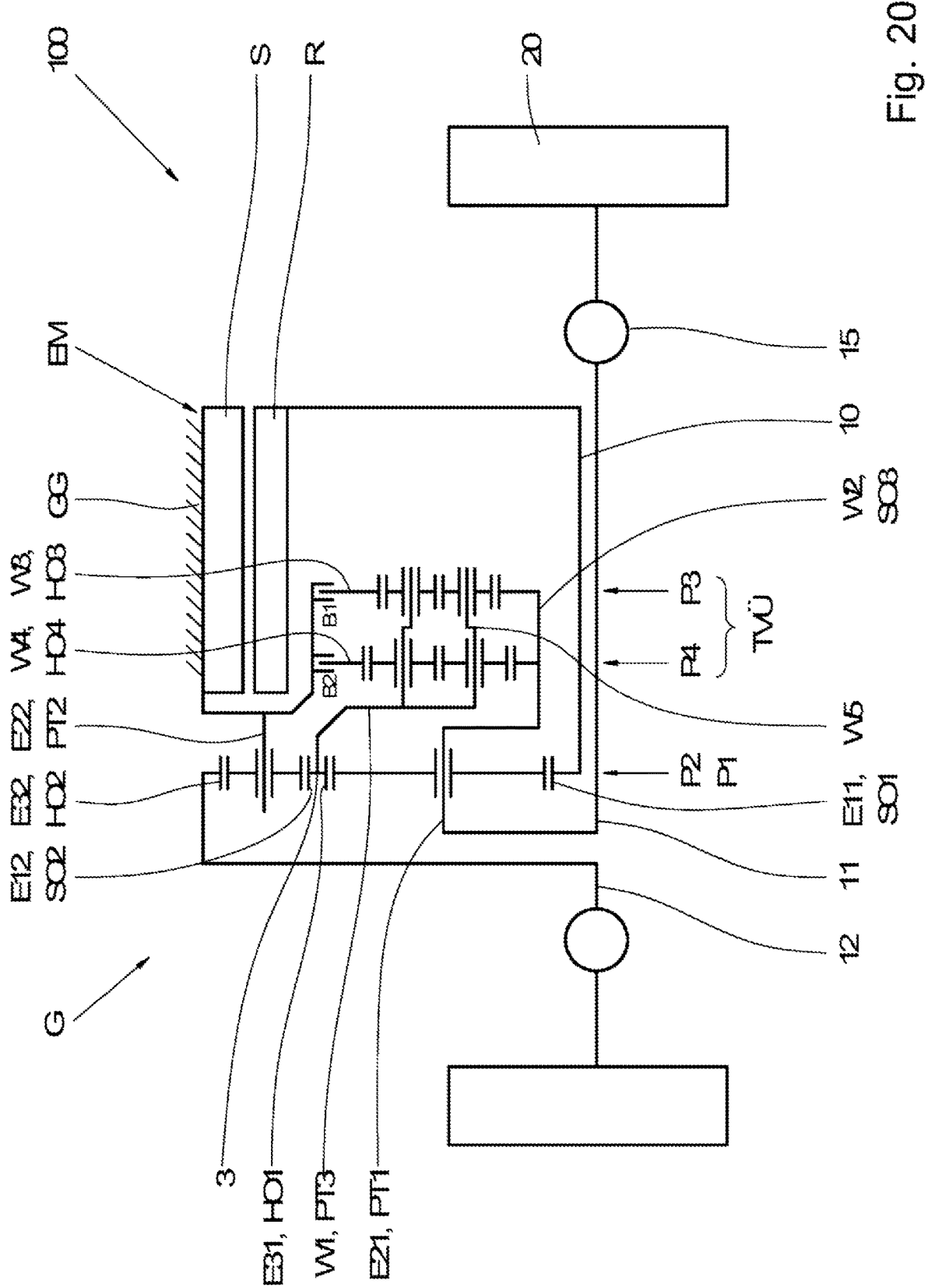
FIGS. 20-27 is a schematic view of a respective drivetrain having a transmission with a torque vectoring superposition unit.

FIG. 20 shows a drivetrain 100 of a vehicle having a transmission G with a torque vectoring superposition unit in a first preferred embodiment. The drivetrain 100 is based on the drivetrain known from FIG. 10, wherein, by contrast thereto, no additional planetary gear P33 is provided in order to increase the rotational speed of the drive machine. The planetary gear sets P1, P2 accordingly constitute the radially stacked arrangement of two minus planetary gear sets, which is likewise known from FIG. 3. This arrangement is particularly highly suitable for the provision of a torque vectoring superposition unit, because the radially stacked arrangement saves axial installation space, which can be used for the torque vectoring superposition unit.

The torque vectoring superposition unit comprises at least one epicyclic transmission, which in the present case is formed by two plus planetary gear sets P3, P4. It furthermore comprises two shift elements B1, B2, which in the present case are configured as brakes.

The planetary gear sets P3, P4 have multiple elements in a manner known per se, which elements are in the present case in the form of sun gears, planetary carriers and ring gears. The third planetary gear set P3 is connected rotationally conjointly to the fourth planetary gear set P4 via an intermediate shaft W5, wherein the intermediate shaft W5 is a constituent part of the common planet carrier PT3, which forms a first connection shaft W1. The first connection shaft W1 is connected rotationally conjointly to the connecting shaft 3. Thus, the first connection shaft is connected rotationally conjointly to the sun gear of the second planetary gear set P2 and to the ring gear HO1 of the first planetary gear set P1.

The two planetary gear sets P3, P4 have a common sun gear SO3, which in the present case forms a second connection shaft W2. The second connection shaft W2 is connected rotationally conjointly to the first output shaft 11 of the first planetary gear set P1. The ring gear HO3 of the third planetary gear set forms a third connection shaft and can be fixed to a non-rotatable structural element of the transmission G by the first shift element, that is to say in the present case by the first brake B1. The ring gear HO4 of the fourth planetary gear set P4 can be fixed to the same non-rotatable structural element by the second shift element, which in the present case is in the form of a second brake B2.

The transmission G furthermore has a drive machine in the form of an electric machine EM with a stator S and a rotor R. The electric machine EM is arranged coaxially with respect to the output shafts 11, 12. The rotor R is connected to the drive shaft 10. As can be clearly seen in FIG. 14, the shift elements B1, B2 and the planet carrier PT2 of the second planetary gear set P2 are fixed to the same non-rotatable structural element as the stator S of the electric machine EM. In the present case, the non-rotatable structural element is a transmission housing GG of the transmission G.

The torque vectoring superposition unit is arranged radially within the rotor R of the electric machine EM, such that the available installation space can be optimally utilized.

A static transmission ratio of the epicyclic transmission P3, P4, that is to say of the torque vectoring superposition unit, is such that a rotational speed at the third drive shaft has a first sign that is greater than zero in the present case, and at the fourth drive shaft has a second sign that is less than zero. The sign of the third shaft is opposite to the sign of the fourth shaft. Thus, the third drive shaft of the third planetary gear set P3 rotates, for example, in a first, positive direction, whereas the fourth drive shaft W4 of the fourth planetary gear set P4 rotates in an opposite, negative direction. Depending on the actuation of the brakes B1 or B2, one of the two output shafts can be braked, and at the same time the torque at the other output shaft can be increased. When the vehicle is traveling straight ahead, that is to say that both output shafts are rotating at the same speed, the third and fourth connection shafts W3, W4 have a rotational speed that is close to zero. This results in a very low differential rotational speed at the shift elements B1 and B2.

A design example of the static transmission ratio $i0$ with
$i0\_P1=-3.00$,
$i0\_P2=-1.33$ and
$i0\_TV\hat{U}=+1.75$
would result in a rotational speed of zero at the third and fourth connection shafts W3, W4. The static transmission ratio of the two plus planetary sets P3, P4 would then for example be
$i0\_P3=+1.83$ and
$i0\_P4=+1.67$.

That is to say, one slightly below and one slightly above the static transmission ratio $i0\_TV\hat{U}=+1.75$ in the case of which, in the presence of identical output rotational speeds, the shift elements would have no differential rotational speed.

Thus, one of the two shafts W3, W4 rotates forward while the other shaft rotates backward. This approach makes it possible to use the torque vectoring unit to increase the torque even at a faster-rotating wheel.

Figure 21:
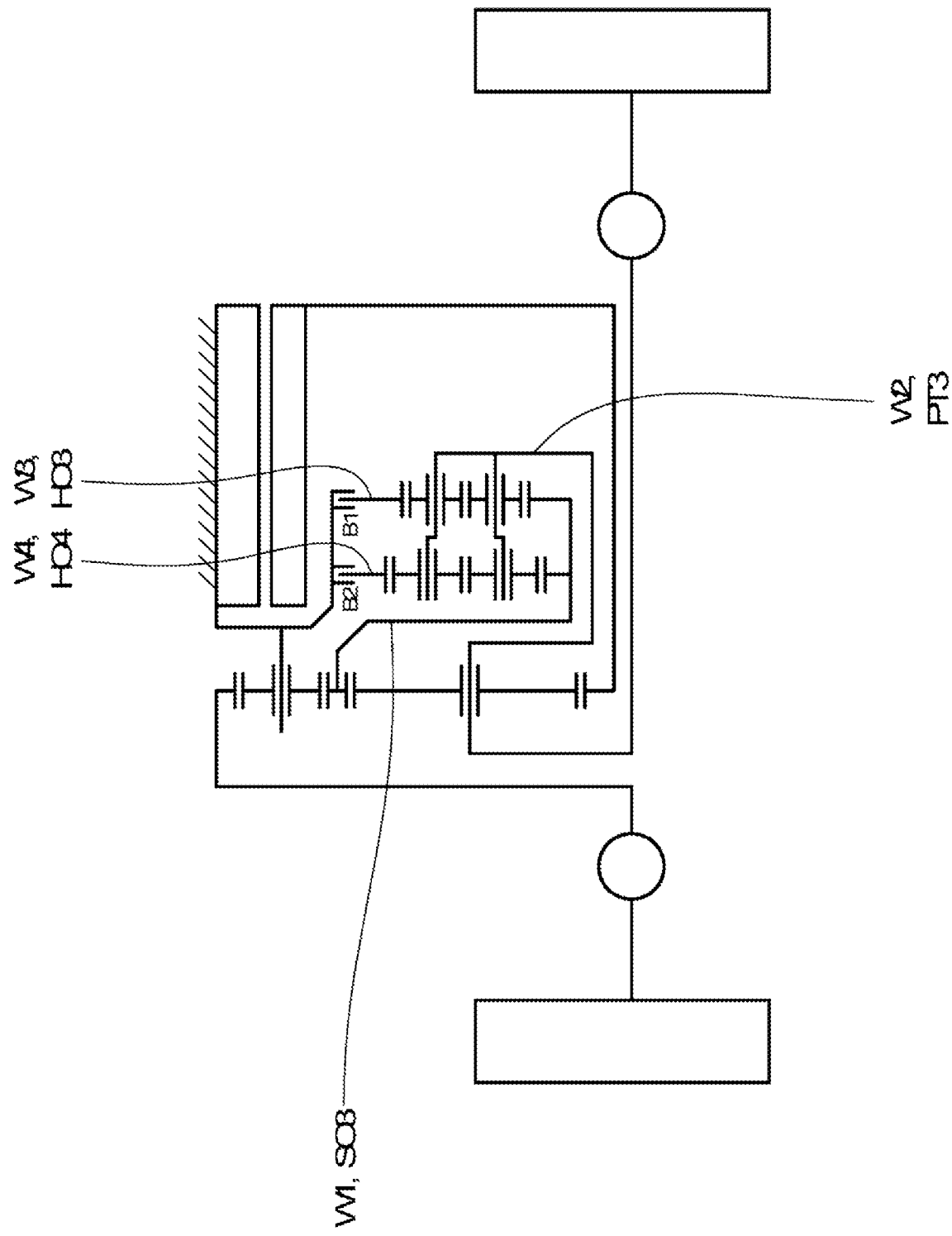

FIG. 21 shows a further preferred embodiment of the torque vectoring unit. By contrast to the embodiment as per FIG. 20, the first connection shaft W1 is formed by the common sun gears SO3 of the two planetary gear sets P3, P4. According to this embodiment, the second connection shaft W2 is formed by the common planet carrier PT3, which is connected to the first planet carrier PT1 of the first planetary gear set P1. Otherwise, the embodiment as per FIG. 21 equates to the embodiment as per FIG. 20, such that reference is made to the description given with regard thereto.

A design example of the static transmission ratio $i0$ with
$i0\_P1=-3.00$,
$i0\_P2=-1.33$ and
$i0\_TV\ddot{U}=+2.33$
would result in a rotational speed of zero at the third and fourth connection shafts W3, W4. The static transmission ratio of the two plus planetary sets P3, P4 would then for example be
$I0\_P3=+2.41$ and
$I0\_P4=+2.25$.

Thus, one of the two shafts W3, W4 rotates forward while the other shaft rotates backward.

Figure 22:
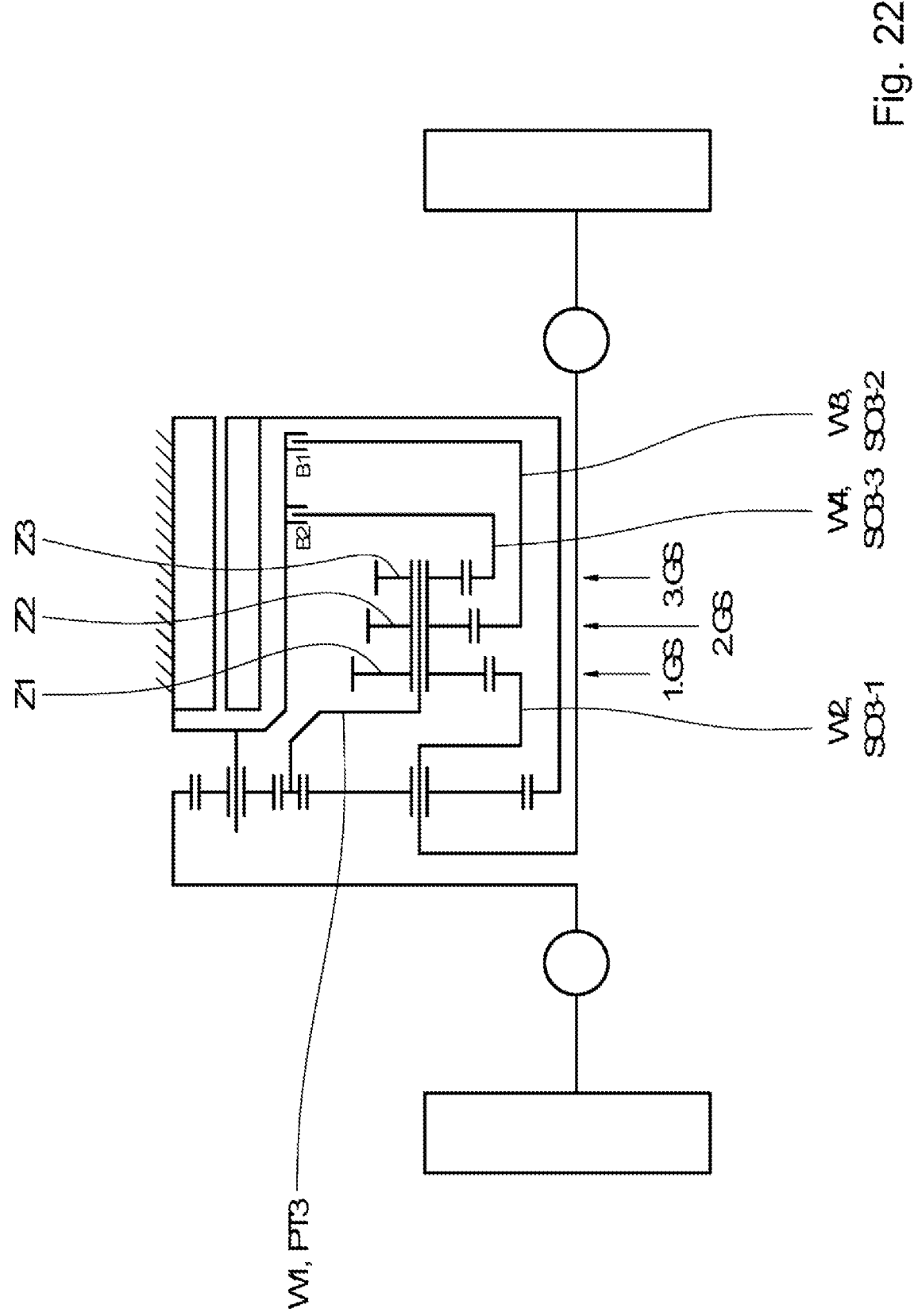

FIG. 22 shows a further preferred embodiment of the torque vectoring unit. The embodiment as per FIG. 22 substantially corresponds to the embodiment as per FIG. 20, with the difference that the epicyclic transmission is in the present case designed as a stepped planet with multiple sun gear connections. The first connection shaft is formed by a planet carrier PT3, which is connected rotationally conjointly to the connecting shaft 3.

Three toothed gears Z1, Z2, Z3 are connected rotationally conjointly to the planet carrier PT3. Each toothed gear forms a respective stage or gear ratio stage. The first toothed gear Z1 has the largest diameter and forms a first gear ratio stage GS. The second toothed gear Z2 has a smaller diameter than the first toothed gear Z1 and forms the second gear ratio stage GS. The third toothed gear Z3 has a smaller diameter than the second toothed gear Z2 and forms a third gear ratio stage GS. The first toothed gear Z1 meshes with a first sun gear SO3-1. This sun gear SO3-1 is connected rotationally conjointly to the planet carrier PT1 and thus forms the second connection shaft W2. The second stage Z2 meshes with a second sun gear SO3-2, which can be fixed by means of the first shift element B1. The sun gear SO3-2 thus forms the third connection shaft. The third stage Z3 meshes with a third sun gear SO3-3, which can be fixed by means of the second shift element B2. The sun gear SO3-3 thus forms the fourth connection shaft.

The particular advantage of this embodiment with a stepped planet is that there is no need for two separate stepped planets, but these can be reduced to a triple stepped planet, that is to say in the present case a plus planetary gear set of stepped-planet construction with three sun gear connections.

Otherwise, this embodiment as per FIG. 22 corresponds to the embodiment as per 20 or 21, such that reference is made to the description given with regard thereto.

A design example of the static transmission ratio $i0$ with
$i0\_P1=-3.00$,
$i0\_P2=-1.33$ and
$i0\_TV\ddot{U}=+1.75$
would result in a rotational speed of zero at the third and fourth connection shafts W3, W4. The static transmission ratio of the two plus planetary sets P3, P4 would then for example be
$i0=+1.83$ (SO3-1 with respect to SO3-3) and
$i0=+1.67$ (SO3-1 with respect to SO3-2).

Thus, one of the two shafts W3, W4 rotates forward while the other shaft rotates backward.

Figure 23:
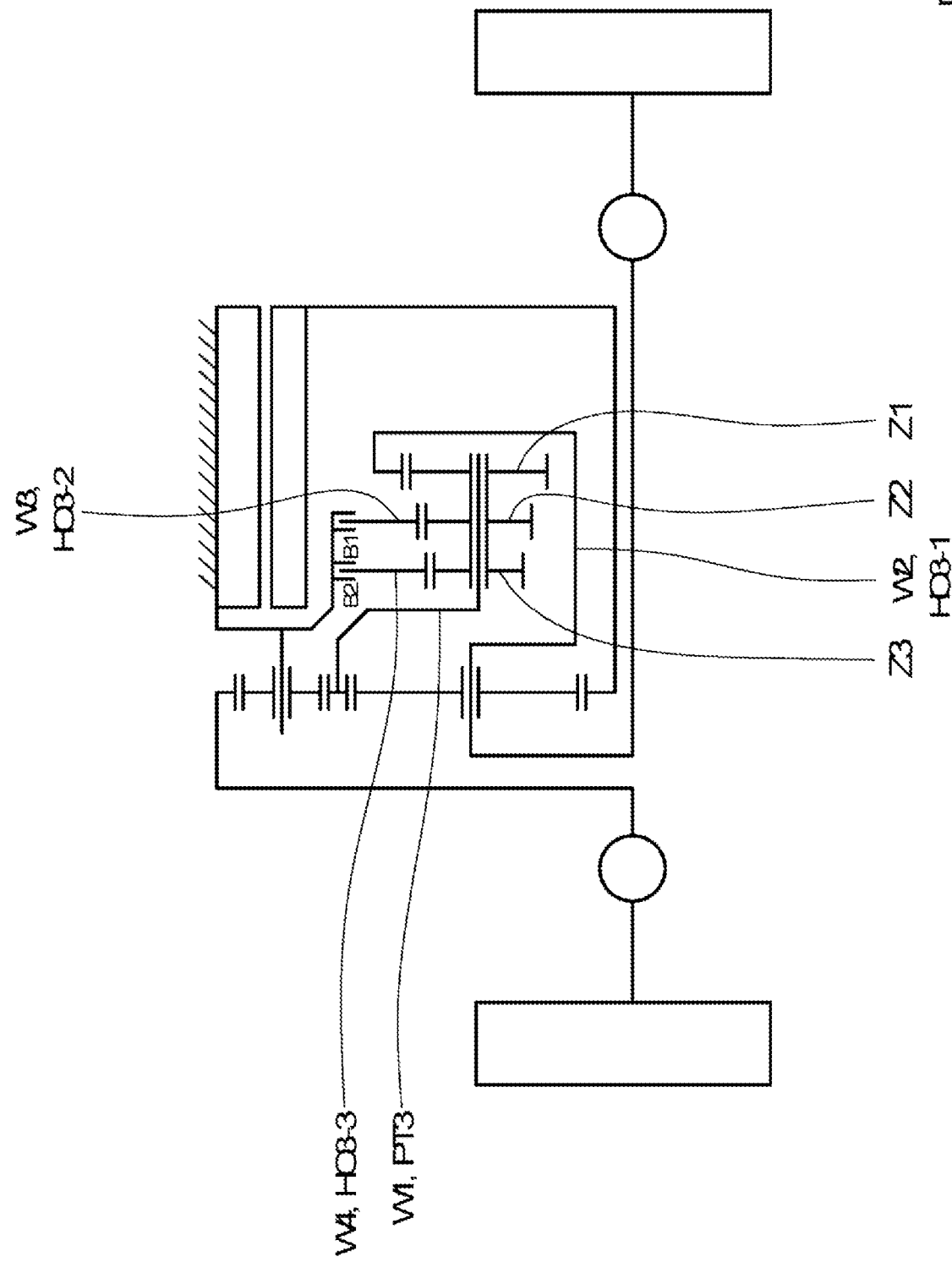

FIG. 23 shows a further preferred embodiment of the torque vectoring superposition unit. This embodiment corresponds substantially to the embodiment as per FIG. 22 with the difference that, now, three ring gear connections are provided instead of the three sun gear connections. A plus planetary gear set of stepped-planet construction with three ring gear connections is thus provided. As a result, the axial sequence of the three stages has been reversed in relation to the embodiment as per FIG. 22. Accordingly, the first toothed gear Z1 meshes with a first ring gear HO3-1, which is connected rotationally conjointly to the planet carrier PT1. The second connection shaft is in this case thus formed by the ring gear HO3-1. The second toothed gear Z2 meshes with a second ring gear HO3-2, which can be fixed by means of the first shift element B1. The ring gear HO3-2 accordingly forms the third connection shaft. The third toothed gear Z3 meshes with a ring gear HO3-3, which can be fixed by means of the second shift element. The third ring gear HO3-3 accordingly forms the fourth connection shaft W4. Otherwise, the embodiment as per FIG. 23 corresponds to the embodiment as per FIG. 22, such that reference is made to the description given with regard thereto.

A design example of the static transmission ratio i0 with
i0_P1=−3.00,
i0_P2=−1.33 and
i0_TVÜ=+1.75
would result in a rotational speed of zero at the third and fourth connection shafts W3, W4. The static transmission ratio of the two plus planetary sets P3, P4 would then for example be
i0=+1.83 (HO3-1 with respect to HO3-2) and
i0=+1.67 (HO3-1 with respect to HO3-2).

Thus, one of the two shafts W3, W4 rotates forward while the other shaft rotates backward.

Figure 24:
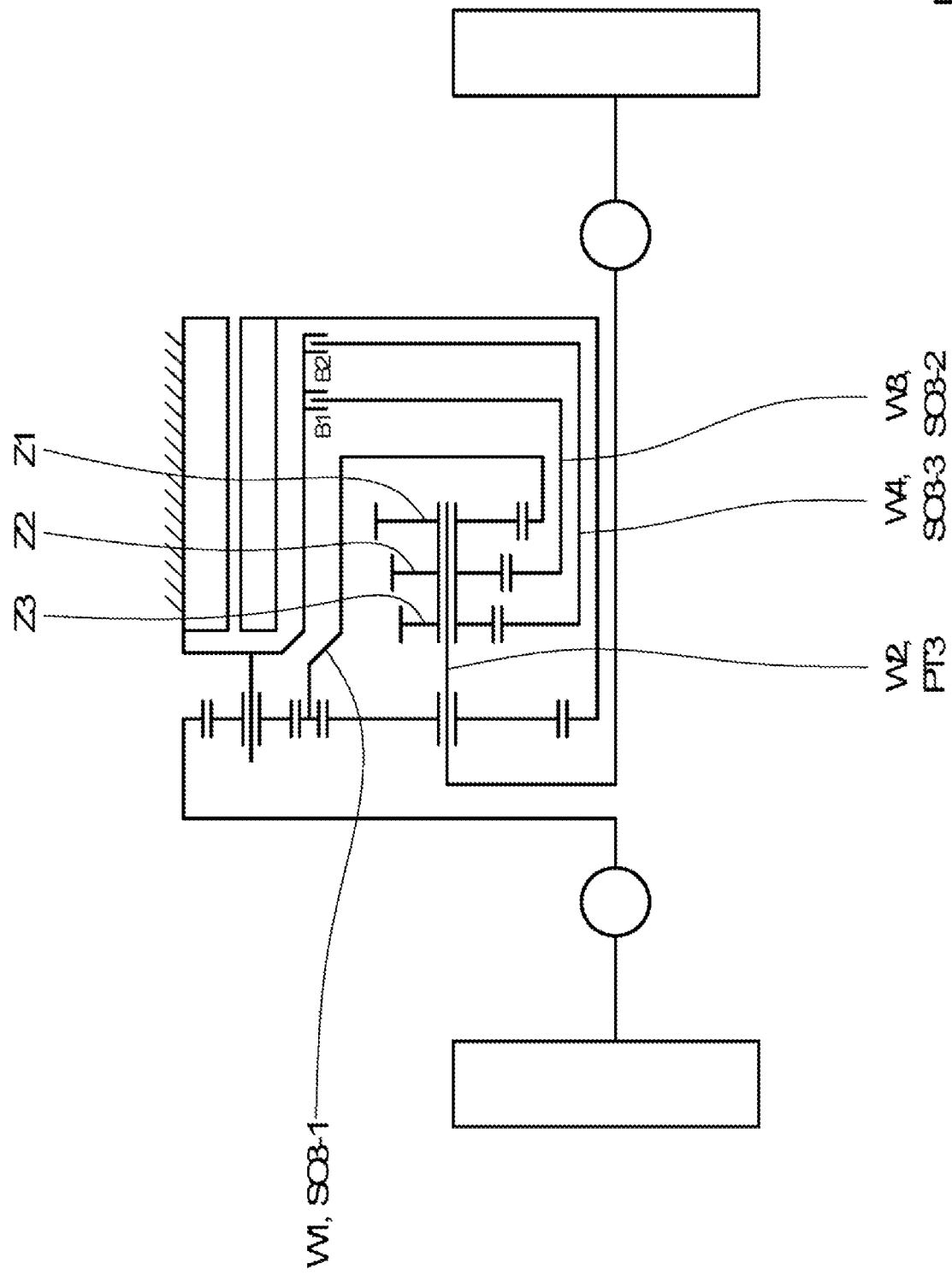

FIG. 24 shows a further preferred embodiment. Here, the embodiment as per FIG. 24 substantially corresponds to the embodiment as per FIG. 21, with the difference that the epicyclic transmission is designed as a plus planetary gear set of stepped construction with three sun gear connections. The carrier of the stepped planet is connected rotationally conjointly to the planet carrier PT1 and thus forms the second connection shaft W2. The stepped planet has three toothed gears Z1, Z2, Z3, which each form a gear ratio stage. The first toothed gear has the largest diameter and meshes with a first sun gear SO3-1, which is connected rotationally conjointly to the connecting shaft 3. The sun gear SO3-1 thus forms the first connection shaft W1. The second toothed gear Z2 meshes with a second sun gear SO3-2, which can be fixed by the first shift element B1. The third toothed gear Z3, the diameter of which is smaller than the diameter of the second toothed gear Z2, meshes with a third sun gear SO3-3, which can be fixed by the second shift element B2. The toothed gear Z2 has a smaller diameter than the toothed gear Z1. The second sun gear SO3-2 accordingly forms the third connection shaft W3. The third sun gear SO3-3 forms the fourth connection shaft W4.

A design example of the static transmission ratio i0 with
i0_P1=−3.00,
i0_P2=−1.33 and
i0_TVÜ=+2.33
would result in a rotational speed of zero at the third and fourth connection shafts W3, W4.

The static transmission ratio of the two plus planetary sets P3, P4 would then for example be
i0=+2.41 (SO3-3 with respect to SO3-1) and
i0=+2.25 (SO3-3 with respect to SO3-2).

Thus, one of the two shafts W3, W4 rotates forward while the other shaft rotates backward.

Figure 25:
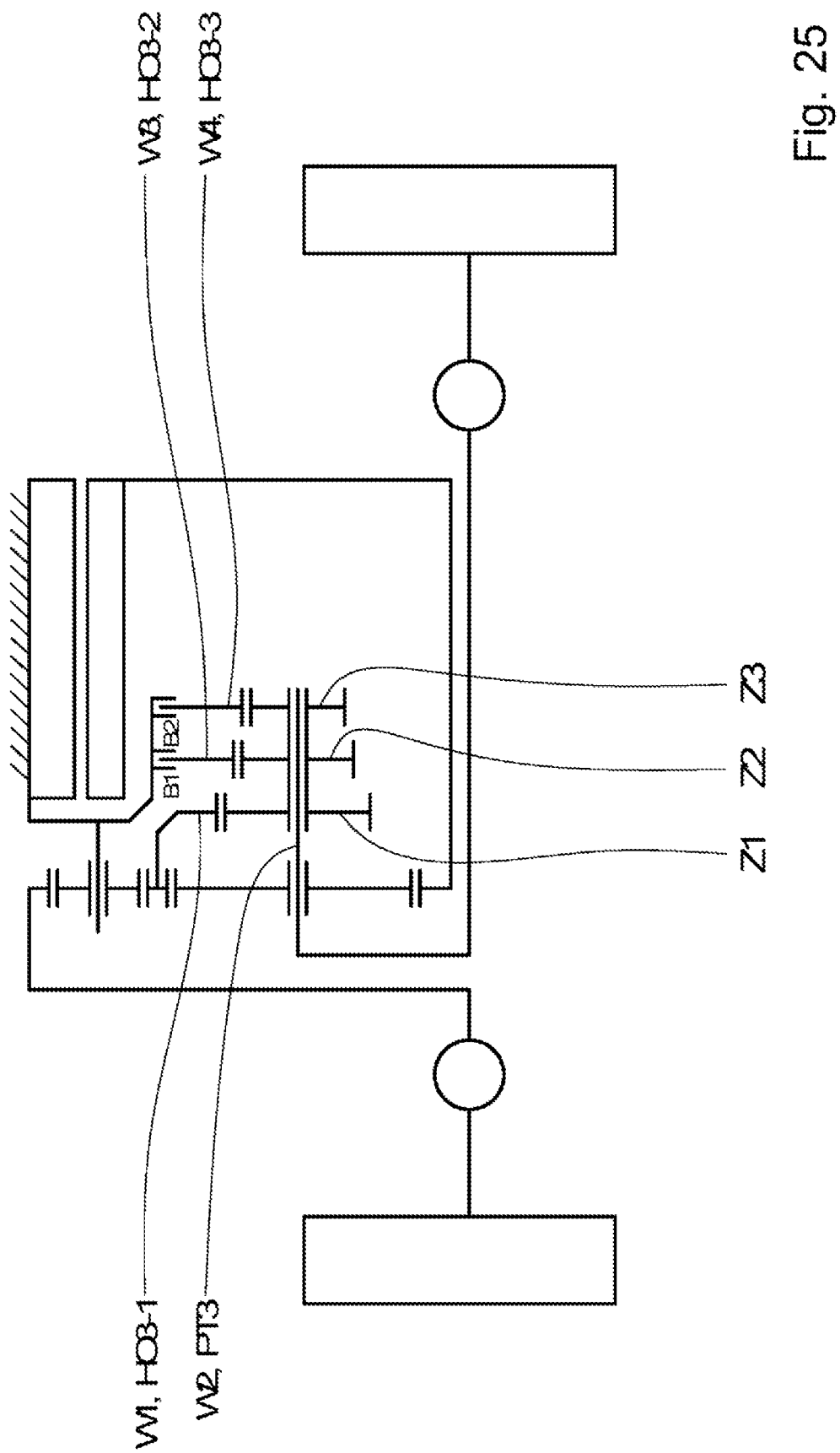

FIG. 25 shows a further preferred embodiment of the torque vectoring superposition unit. Here, the embodiment as per FIG. 25 corresponds substantially to the embodiment as per FIG. 24 with the difference that, now, three ring gear connections are provided instead of the three sun gear connections. As a result, the toothed gears Z1, Z2, Z3 are in a different axial sequence than the toothed gears according to the embodiment as per FIG. 24. The toothed gear Z1 meshes with a first ring gear HO3-1, which is connected rotationally conjointly to the connecting shaft 3. The ring gear HO3-1 accordingly forms the first connection shaft. The toothed gear Z2 meshes with a second ring gear HO3-2, which can be fixed by the first shift element B1. The toothed gear Z3 meshes with a third ring gear HO3-3, which can be fixed by the second shift element B2. The ring gear HO3-2 forms the third connection shaft, whilst the third ring gear HO3-3 forms the fourth connection shaft. Otherwise, the embodiment of FIG. 25 corresponds to the embodiment of FIG. 24, such that reference is made to the description given with regard thereto.

A design example of the static transmission ratio i0 with
i0_P1=−3.00,
i0_P2=−1.33 and
i0_TVÜ=+2.33
would result in a rotational speed of zero at the third and fourth connection shafts W3, W4.

The static transmission ratio of the two plus planetary sets P3, P4 would then for example be
i0=+2.41 (HO3-1 with respect to HO3-3) and
i0=+2.25 (HO3-1 with respect to HO3-2).

Thus, one of the two shafts W3, W4 rotates forward while the other shaft rotates backward. The static transmission ratios of the triple stepped-planet set would then for example be +2.41 (HO3-1 to HO3-3) and +2.25 (HO3-1 to HO3-2). Thus, one of the two shafts w3a and w3b would rotate forward and the other would rotate backward.

Figure 26:
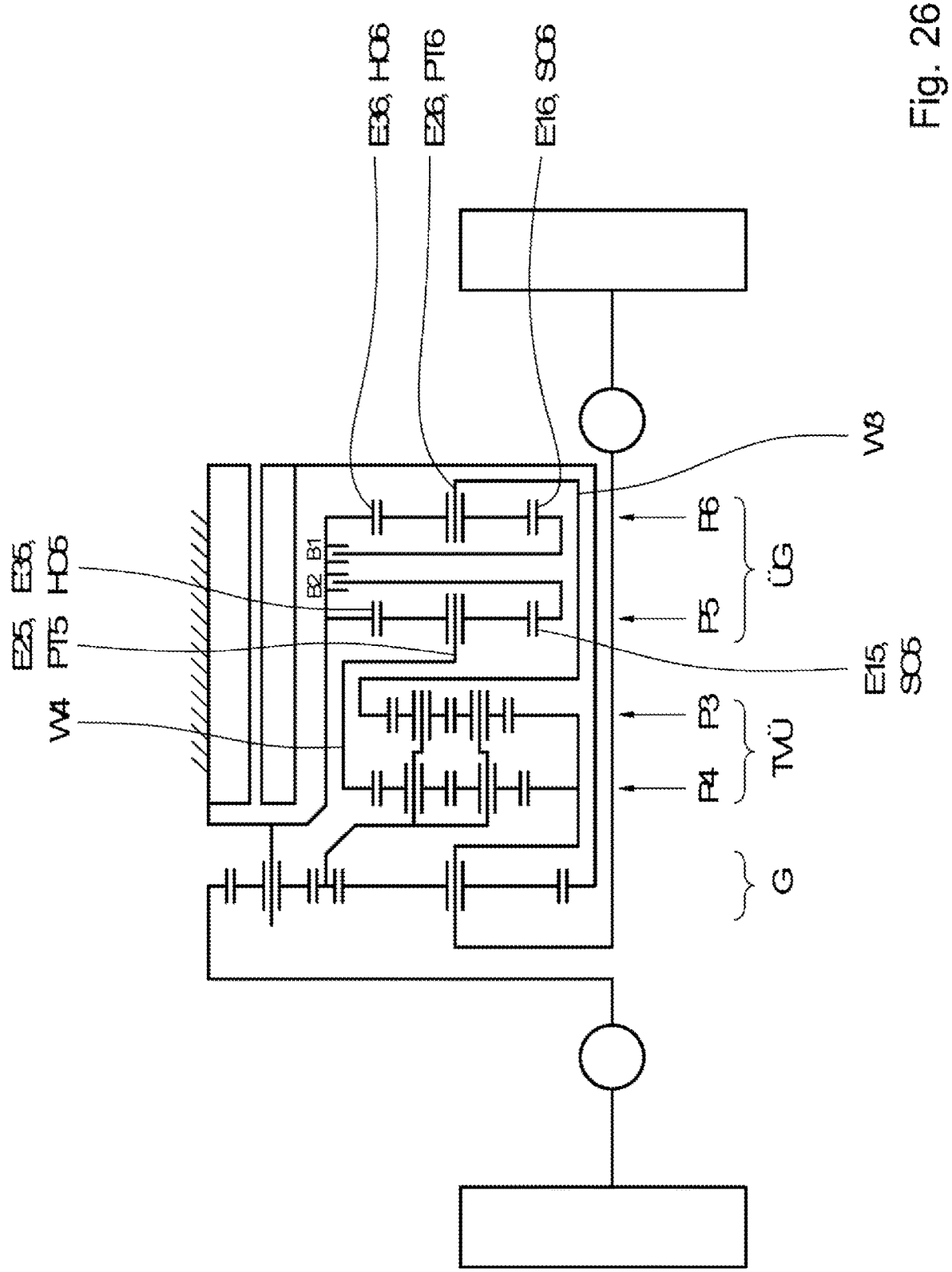

FIG. 26 shows a further preferred embodiment of the torque vectoring superposition unit. The embodiment as per FIG. 26 is based on the embodiment as per FIG. 20, wherein a transmission gearing UG is additionally provided. The transmission gearing UG comprises a fifth planetary gear set P5 and a sixth planetary gear set P6. The transmission gearing UG is arranged radially within the rotor R. Here, the third connection shaft W3, that is to say in the present case the ring gear HO3, is connected to a second element E26 of the sixth planetary gear set, which in the present case is configured as a planet carrier PT6. The fourth connection shaft W4, which in the present case is a ring gear HO4, is connected rotationally conjointly to the second element E25 of the fifth planetary gear set P5, which in the present case is in the form of a planet carrier PT5. The two planetary gear sets P5, P6 each have a third element E35, E36 in the form of a ring gear HO5, HO6, which is permanently fixed to the non-rotatable structural element GG. The fifth planetary gear set P5 furthermore has a first element E15, which in the present case is in the form of a sun gear SO5 which can be connected rotationally conjointly to the ring gear HO5 by the second shift element B2. The sixth planetary gear set P6 has a first element E16, which in the present case is in the form of a sun gear SO6 and which can be connected rotationally conjointly to the ring gear HO6 by the first shift element B1. When the first shift element B1 is actuated, the sun gear SO6 is fixed. When the second shift element B2 is actuated, the sun gear SO5 is fixed.

Figure 27:
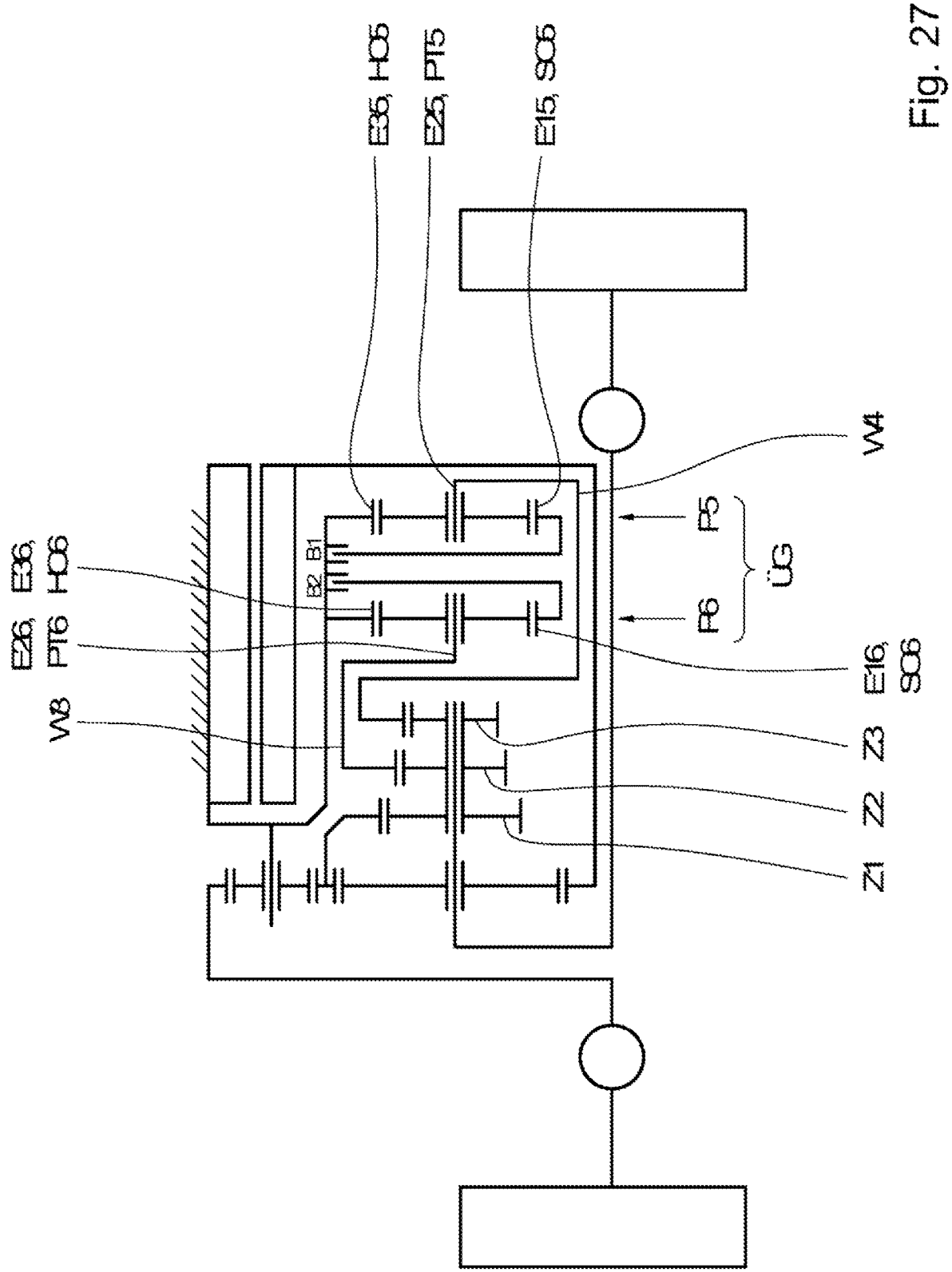

FIG. 27 shows a further preferred embodiment of the torque vectoring superposition unit. By contrast to the embodiment as per FIG. 26, the transmission gearing UG is shown in conjunction with a plus planetary gear set of stepped-planet construction. Aside from this difference, this embodiment corresponds substantially to the embodiment as per FIG. 26.

The invention has been described and explained comprehensively with reference to the drawings and the description. The description and explanation are to be understood as examples and not as being limiting. The invention is not limited to the disclosed embodiments. Other embodiments or variations will become apparent to a person skilled in the art from the use of the present invention and from a close analysis of the drawings, the disclosure and the following patent claims.

In the patent claims, the words "comprising" and "having" do not exclude the presence of further elements or steps. The indefinite article "a" or "an" does not exclude the presence of a multiplicity. A single element or a single unit may perform the functions of several of the units mentioned in the patent claims. The mere mention of certain measures in several different dependent patent claims should not be understood to mean that a combination of these measures cannot likewise be advantageously used.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A transmission, comprising:
an input shaft;
a first output shaft;
a second output shaft;
a connecting shaft;
a first planetary gear set comprising a first set of multiple elements; and
a second planetary gear set connected to the first planetary gear set, comprising a second set of multiple elements,
wherein the input shaft, the first and second output shafts, and the first and second planetary gear sets, are configured such that:
a torque introduced via the input shaft is converted and divided between the first output shaft and the second output shaft in a defined ratio, and a generation of a sum torque is prevented;
wherein at least one element of the first set of multiple elements of the first planetary gear set is connected rotationally conjointly to another element of the second set of multiple elements of the second planetary gear set via the connecting shaft; and
a further element of the second set of multiple elements of the second planetary gear set is fixed to a non-rotatable structural element; and
a torque vectoring superposition unit, comprising:
an epicyclic transmission having at least four connection shafts; and
two shift elements,
wherein at least a first connection shaft is connected rotationally conjointly to the connecting shaft,
wherein at least a second connection shaft is connected rotationally conjointly to the first output shaft of the first planetary gear set, and
wherein the two shift elements are configured to fix an at least a third and a fourth connection shaft to the non-rotatable structural element.

2. The transmission as claimed in claim 1, wherein the epicyclic transmission is a stepped-planet construction.

3. The transmission as claimed in claim 1, wherein the epicyclic transmission is a plus planetary gear set.

4. The transmission as claimed in claim 1, wherein a transmission gearing, configured as at least one planetary transmission or a spur-gear transmission, is provided for applying a speed ratio to a rotational speed of the third and/or the fourth connection shaft.

5. The transmission as claimed in claim 1, wherein the torque vectoring superposition unit is arranged at least partially radially within a rotor of an electric machine, which is a drive machine of the transmission.

6. The transmission as claimed in claim 1, wherein the torque vectoring superposition unit and a rotor of an electric machine provided as drive machine of the transmission are axially spaced apart from one another.

7. The transmission as claimed in claim 1, wherein each of the shift elements is one of a clutch and a brake.

8. The transmission as claimed in claim 1, wherein, in an occurrence of equal rotational speeds at the two output shafts:
a first static transmission ratio of the epicyclic transmission is such that a rotational speed at the at least third connection shaft has a first sign;
a second static transmission ratio of the epicyclic transmission is such that a rotational speed at the at least fourth connection shaft has a sign opposite to that of the third connection shaft;
the at least third connection shaft of the epicyclic transmission has a first direction of rotation; and
the at least fourth connection shaft of the epicyclic transmission has a second direction of rotation opposite the first direction of rotation.

9. The transmission as claimed in claim 1, wherein the epicyclic transmission is a third and a fourth planetary gear set, wherein
the third and fourth planetary gear sets are each configured as a plus planetary gear set;
a respective sun gear of the third planetary gear set and the fourth planetary gear set together form a second connection shaft;
a planet carrier of the third planetary gear set and the fourth planetary gear set together form a first connection shaft,
a ring gear of the third planetary gear set forms a third connection shaft and is configured to be fixed by one of the two shift elements; and
a ring gear of the fourth planetary gear set forms a fourth connection shaft and is configured to be fixed by the other of the two shift elements.

10. The transmission as claimed in claim 1, wherein the epicyclic transmission is in the form of a third and a fourth planetary gear set, wherein
the third and fourth planetary gear sets are configured as plus planetary gear sets;
a respective sun gear of the third and of the fourth planetary gear set together form a first connection shaft;
a planet carrier of the third and the fourth planetary gear set together form a second connection shaft;
a ring gear of the third planetary gear set forms a third connection shaft and is configured to be fixed by one of the two shift elements; and
a ring gear of the fourth planetary gear set forms a fourth connection shaft and is configured to be fixed by the other of the two shift elements.

11. The transmission as claimed in claim 1, wherein the epicyclic transmission is a plus planetary gear set of stepped construction with three stages, wherein
a planet carrier forms a first connection shaft;
a sun gear of a first stage forms a second connection shaft;
a sun gear of a second stage forms a third connection shaft and is configured to be fixed by one of the two shift elements; and a sun gear of a third stage forms a fourth connection shaft and is configured to be fixed by the other of the two shift elements.

12. The transmission as claimed in claim 1, wherein the epicyclic transmission is a plus planetary gear set of stepped construction with three stages, wherein
a planet carrier forms a first connection shaft;
a ring gear of a first stage forms a second connection shaft;
a ring gear of a second stage forms a third connection shaft and is configured to be fixed by one of the two shift elements; and
a ring gear of a third stage forms a fourth connection shaft and configured to be fixed by the other of the two shift elements.

13. The transmission as claimed in claim 1, wherein the epicyclic transmission is in a plus planetary gear set of stepped construction with three stages, wherein
a planet carrier forms a second connection shaft;
a sun gear of a first stage forms a first connection shaft;
a sun gear of a second stage forms a third connection shaft and is configured to be fixed by one of the two shift elements; and
a sun gear of a third stage forms a fourth connection shaft and is configured to be fixed by the other of the two shift elements.

14. The transmission as claimed in claim 1, wherein the epicyclic transmission is a plus planetary gear set of stepped construction with three stages, wherein
a planet carrier forms a second connection shaft;
a ring gear of a first stage forms a first connection shaft;
a ring gear of a second stage forms a third connection shaft and is configured to be fixed by one of the two shift elements; and
a ring gear of a third stage forms a fourth connection shaft and is configured to be fixed by the other of the two shift elements.

15. The transmission as claimed in claim 1, wherein the epicyclic transmission comprises two plus planetary gear sets.

16. A drivetrain having a transmission, comprising:
an input shaft;
a first output shaft;
a second output shaft;
a connecting shaft;
a first planetary gear set comprising a first set of multiple elements; and
a second planetary gear set connected to the first planetary gear set, comprising a second set of multiple elements,
wherein the input shaft, the first and second output shafts, and the first and second planetary gear sets, are configured such that:
a torque introduced via the input shaft is converted and divided between the first output shaft and the second output shaft in a defined ratio, and a generation of a sum torque is prevented;
wherein at least one element of the first set of multiple elements of the first planetary gear set is connected rotationally conjointly to another element of the second set of multiple elements of the second planetary gear set via the connecting shaft; and
a further element of the second set of multiple elements of the second planetary gear set is fixed to a non-rotatable structural element; and
a torque vectoring superposition unit, comprising:
an epicyclic transmission having at least four connection shafts; and
two shift elements,
wherein at least a first connection shaft is connected rotationally conjointly to the connecting shaft,
wherein at least a second connection shaft is connected rotationally conjointly to the first output shaft of the first planetary gear set, and
wherein the two shift elements are configured to fix an at least a third and a fourth connection shaft to the non-rotatable structural element.

17. A vehicle having a transmission, comprising:
an input shaft;
a first output shaft;
a second output shaft;
a connecting shaft;
a first planetary gear set comprising a first set of multiple elements; and
a second planetary gear set connected to the first planetary gear set, comprising a second set of multiple elements,
wherein the input shaft, the first and second output shafts, and the first and second planetary gear sets, are configured such that:
a torque introduced via the input shaft is converted and divided between the first output shaft and the second output shaft in a defined ratio, and a generation of a sum torque is prevented;
wherein at least one element of the first set of multiple elements of the first planetary gear set is connected rotationally conjointly to another element of the second set of multiple elements of the second planetary gear set via the connecting shaft; and
a further element of the second set of multiple elements of the second planetary gear set is fixed to a non-rotatable structural element; and
a torque vectoring superposition unit, comprising:
an epicyclic transmission having at least four connection shafts; and
two shift elements,
wherein at least a first connection shaft is connected rotationally conjointly to the connecting shaft,
wherein at least a second connection shaft is connected rotationally conjointly to the first output shaft of the first planetary gear set, and
wherein the two shift elements are configured to fix an at least a third and a fourth connection shaft to the non-rotatable structural element.

* * * * *